(12) United States Patent
Kim et al.

(10) Patent No.: US 9,181,605 B2
(45) Date of Patent: Nov. 10, 2015

(54) TREATMENT METHOD OF SPENT URANIUM CATALYST

(71) Applicants: KOREA ATOMIC ENERGY RESEARCH INSTITUTE, Daejeon (KR); KOREA HYDRO AND NUCLEAR POWER CO., LTD., Gyeongsangbuk-do (KR)

(72) Inventors: Kwang-Wook Kim, Daejeon (KR); Eil-Hee Lee, Daejeon (KR); Keun-Young Lee, Daejeon (KR); Jei-Kwon Moon, Daejeon (KR); Dong-Yong Chung, Daejeon (KR)

(73) Assignees: KOREA ATOMIC ENERGY RESEARCH INSTITUTE, Daejeon (KR); KOREA HYDRO AND NUCLEAR POWER CO., LTD., Gyeongsangbuk-do (KR)

( * ) Notice: Subject to any disclaimer, the term of this patent is extended or adjusted under 35 U.S.C. 154(b) by 472 days.

(21) Appl. No.: 13/960,046

(22) Filed: Aug. 6, 2013

(65) Prior Publication Data
US 2014/0096646 A1    Apr. 10, 2014

(30) Foreign Application Priority Data
Oct. 8, 2012    (KR) .................. 10-2012-0111261

(51) Int. Cl.
C22B 60/00    (2006.01)
B01D 61/44    (2006.01)
G21F 9/28    (2006.01)
G21F 9/06    (2006.01)
C22B 60/02    (2006.01)

(52) U.S. Cl.
CPC ............ *C22B 60/0217* (2013.01); *B01D 61/44* (2013.01); *C22B 60/0278* (2013.01); *G21F 9/06* (2013.01); *G21F 9/28* (2013.01); *Y02W 30/54* (2013.01)

(58) Field of Classification Search
CPC    C22B 60/0217; C22B 60/0278; B01D 61/44; G21F 9/28; G21F 9/06
See application file for complete search history.

(56) References Cited

U.S. PATENT DOCUMENTS 5,419,881 A * 5/1995 Sameh et al. .................. 423/20

FOREIGN PATENT DOCUMENTS

| KR | 10-0587157 | 6/2004 |
| KR | 10-0926462 | 5/2009 |
| KR | 10-2011-0007623 | 1/2011 |

* cited by examiner

*Primary Examiner* — George Wyszomierski
*Assistant Examiner* — Tima M McGuthry Banks
(74) *Attorney, Agent, or Firm* — Bachman & LaPointe, P.C.

(57) ABSTRACT

The present invention relates to a treatment method of spent uranium catalyst, and more specifically, to a method which can considerably reduce the volume of the spent uranium catalyst to be disposed of and simultaneously minimize secondary wastes that can be generated during the process of treating the spent uranium catalyst.

20 Claims, 19 Drawing Sheets

TREATMENT METHOD OF SPENT URANIUM CATALYST

CROSS-REFERENCE TO RELATED APPLICATIONS

This application claims priority from Korean Patent Application No. 10-2012-0111261, filed on Oct. 8, 2012, in the Korean Intellectual Property Office, the disclosure of which is incorporated herein by reference in its entirety.

BACKGROUND

1. Field of the Invention

The present invention relates to a treatment method of spent uranium catalyst, and more specifically, to a method which can considerably reduce the volume of the spent uranium catalyst to be disposed of and simultaneously minimize secondary wastes that can be generated during the process of treating the spent uranium catalyst.

2. Description of the Related Art

Since the 1970s, U—$SbO_x$/$SiO_2$ catalyst which is supported by $USbO_5$ or $USb_3O_{10}$, complex compounds of uranium (U) and antimony (Sb), on a porous silicon (support: $SiO_2$), or $U_wSb_xFe_aAl_bMo_cV_dO_z$/$SiO_2$ catalyst in which iron (Fe), aluminum (Al), molybdenum (Mo), vanadium (V), bismuth (Bi), as well as U and Sb are mixed have been developed in order to produce acrylonitrile ($CH_2$=CHCN), a base material of synthetic fiber. These uranium catalysts use only depleted uranium having U-238 with U-235 mostly eliminated.

These uranium catalysts, which were used by Du Pont, or Union Carbide in U.S.A., or Sohio of Japan, etc. until approximately 2000, have been replaced by nonradioactive catalysts which are free of uranium since 2000. A South Korean private company had produced acrylic synthetic fiber using the uranium catalyst until 2004 and since then has used the nonradioactive catalyst, and consequently, approximately 7,100 drums (one drum is 200 liters) of spent uranium catalysts, which had been generated until the use of nonradioactive catalysts, are stored at the site. Although not accurate, the amount of the stored uranium waste at the acrylonitrile production sites in foreign countries, is also expected to be voluminous.

In regard to a domestic regulation on disposal of low and intermediate level radioactive wastes, Notification No. 205-18 published by Korean Ministry of Science and Technology regulates alpha radioactivity of a solid radioactive waste to be 3,700 Bq/g or below, which corresponds to 14.6 wt % U for natural uranium and 25.2 wt % for depleted uranium. In order to discharge the radioactive wastes at the same level as the nonradioactive wastes into the environment, as exempt waste, the solid wastes need to have very low concentration of U, which is approximately 0.005 wt % or less.

Currently, the radioactivity of the spent uranium catalyst using the depleted uranium generated within South Korea conforms with the standards for transferring radioactive wastes to a radioactive waste disposal site to be operated in Gyeongju area in the future. Although the current disposal of the wastes costs approximately KRW 8.5 million per 200 L drum, the cost is expected to reach nearly KRW 10 million per the same-volume drum. Moreover, given that the volume increases due to additives added in the process of preparing the solid form for the disposal of the spent uranium catalyst, the final wastes to be disposed of add up to nearly 10,000 drums and thus the direct disposal cost can amount to KRW 100 billion.

The U used for the spent uranium catalyst is depleted uranium, which has little economic value, and therefore, if the U from the spent uranium catalyst is selectively and completely disposed of at a radioactive waste disposal site, the volume of the wastes to be disposed of can be reduced by up to 95% theoretically, and the disposal cost for the separated U can be approximately KRW 5 billion. As a means to use effectively the domestic radioactive waste disposal facilities to be constructed in the future and to minimize the secondary wastes for the reduction of the disposal cost for the spent uranium catalyst, an effective technology is needed for reducing the volume of the spent uranium catalyst by separating U exclusively from the spent uranium catalyst as much as possible while reducing the disposal cost.

Another concern is that, if acidic or alkaline solutions used to eliminate metals or Si, a supporter material, which are included in the spent uranium catalyst, are left after treatment of the spent uranium catalyst, much amount of secondary wastes to be disposed of can be generated due to the left acidic or alkaline solutions.

Therefore, a technology is necessary, to eliminate dissolved metal materials including uranium from the acidic and alkaline solutions after the process of eliminating uranium by using the acidic and alkaline solutions and then recover the acidic and alkaline solution by using electrodialysis from the mixture of several inorganic solutions used in the treatment process for the volume reduction of spent uranium catalyst.

Conventional technologies for reducing the volume of spent uranium catalyst for disposal and for preventing secondary wastes from being generated are introduced in the after-mentioned documents. Patent Document 1 introduces a method in which sodium carbonate or sodium hydrogen carbonate is mixed with the spent catalyst to dissolve Si, a main component of spent uranium catalyst; the mixture is reacted at a high temperature (1,000~1,600° C.) to produce sodium silicate; water is added to the sodium silicate under 1~10 atm and at a temperature of 10~200° C. to create liquid sodium silicate; and the liquid sodium silicate and undissolved solid materials are separated by a solid-liquid separator. However, the method above focuses on how to separate the Si from the spent uranium catalyst, and therefore can overlook a point that part of U can be dissolved together in the alkali carbonate solution and then the U can remain in the secondary liquid waste generated from the process of treating the spent uranium catalyst. And since the method does not provide a measure of treating secondary liquid waste, reducing the volume of the spent uranium catalyst can be limited.

Patent Document 2 introduces a method in which, as a dry process, alkali carbonate is added to the spent uranium catalyst and stirred to react at a temperature of 1,000 to 1,600° C. in order to change the components of the spent catalyst into the form of alkali salt; or as a wet process, alkali hydroxide is dissolved in water and the spent uranium catalyst powder is mixed uniformly with the aqueous solution to react under the condition of 1 to 20 atm and at a temperature of 10 to 300° C. in order to change the components of the spent uranium catalyst into the form of alkali salt. However, this method overlooks the fact that uranium can be dissolved together with other components including Si in carbonate solution or alkali hydroxide solution and it can be intermixed with the dissolved Si solution. Consequently, the method above is practically limited in treating the spent uranium catalyst as it does not present an alternative to handling the Si precipitate contaminated with uranium and the uranium-bearing solution.

Patent Document 3 suggests a method in which spent uranium catalyst is heated at a temperature of 1,200 to 1,800° C. to separate and cool antimony oxide, molybdenum oxide, or volatile materials of the mixture of antimony oxide and molybdenum oxide, and to collect the powder, and remaining wastes from which the volatile material is separated and eliminated are heated at a reduced temperature of 600 to 1,300° C., and then a vitrifying agent is added to vitrify the remaining wastes in order to treat the spent uranium catalyst. But, the method above cannot be effective in reducing the volume due to a small content of the volatile materials in the spent uranium catalyst and in reducing the processing cost due to a larger amount of economic costs for the high-temperature treatment and the collection of the volatilized materials, compared with direct disposal cost of the spent uranium catalyst.

As stated above, technologies for treating the sparingly-soluble spent uranium catalyst have not been significantly developed. Referring to the Patent Documents 1, 2, and 3 mentioned above, dissolving the spent catalyst in the alkaline conditions at a high temperature/pressure causes weakness in the operating stability.

Accordingly, in the conventional technologies, the economic costs can increase and treating the uranium remaining in the secondary waste solutions can be challenging to be overcome.

In light of the situation above, there is an urgent need to develop environmentally-friendly technologies that can minimize the generation of secondary wastes and reduce the volume and weight of the spent uranium catalyst to be disposed effectively.

DOCUMENTS ON PRIOR TECHNOLOGIES

Patent Documents (Patent Doc. 1) Korean Patent No. 10-0587157
(Patent Doc. 2) Korean Patent Publication No. 10-2011-0007623
(Patent Doc. 3) Korean Patent No. 10-0926462

SUMMARY OF THE INVENTION

The objective of the present invention is to provide a treatment method of spent uranium catalyst.

In order to achieve the aforementioned objective, the present invention provides the treatment method of spent uranium catalyst including the following steps of:

Dissolving spent uranium catalyst in alkaline solution, and taking undissolved spent uranium catalyst out, and then dissolving the undissolved spent uranium catalyst in acidic solution (acid-alkali swing dissolution) (Step 1);

adding a carbonate and a hydrogen peroxide to the alkaline solution obtained at Step 1 and adjusting to pH 6~10 to precipitate a supporter material such as Si of the spent catalyst, and then precipitating metal materials dissolved from the spent catalyst by adding the hydrogen peroxide, while adjusting the pH, to a mixture solution of the acidic solution obtained at Step 1 and the supernatant of the alkaline solution after the precipitation of supporter material (Step 2); and removing uranium from the supernatant of the mixture solution after the metal materials are precipitated at Step 2 (Step 3).

The present invention provides further a treatment method of spent uranium catalyst which includes the following steps of:

Dissolving spent uranium catalyst in alkaline solution, and taking undissolved spent uranium catalyst out, and then dissolving the undissolved spent uranium catalyst further in acidic solution (acid-alkali swing dissolution) (Step 1);

precipitating a supporter material of the spent catalyst such as Si component by adding one selected from the group consisting of $MgCl_2$, $CaCl_2$, KCl, and NaCl while lowering pH of the alkaline solution obtained at Step 1, and precipitating metal materials of the spent catalyst by adding hydrogen peroxide, while adjusting the pH, to a mixture solution of the acidic solution obtained at Step 1 and a supernatant of the alkaline solution generated from the precipitation of the supporter material (Step 2); and removing uranium from the supernatant of the mixture solution after the metal materials are precipitated at Step 2 (Step 3).

According to the present invention, the method above may be effective in maximizing the volume reduction efficiency for the spent uranium catalyst by using the processes of dissolving the spent uranium catalyst in which $U_wSb_xM_yO_z$ (M=one or more selected from among Fe, Al, Mo, V, and Bi, where, w, x, y, z represent a molar ratio comprising oxide) is supported in a Si support, and of precipitating Si exclusively and selectively from the dissolved uranium and the Si.

Further, the present invention may provide an environmentally-friendly treatment method of spent uranium catalyst as secondary wastes can be minimally generated by electrodialyzing mixture of the acidic and alkaline solutions which are used to dissolve, separate, and remove the components of spent uranium catalyst.

BRIEF DESCRIPTION OF THE DRAWINGS

The foregoing and/or other aspects of the present invention will be more apparent upon reading the description of certain exemplary embodiments with reference to the accompanying drawings, in which.

DETAILED DESCRIPTION OF EXEMPLARY EMBODIMENTS

According to an embodiment of the present invention, a method for treating spent uranium catalyst is provided, which may include the steps of: dissolving the spent uranium catalyst in an alkaline solution, taking the undissolved spent uranium catalyst out from the solution, and then dissolving the undissolved spent uranium catalyst further in an acidic solution (acid-alkali swing dissolution) (Step 1);

precipitating Si, a spent catalyst supporter material, by adding carbonate and hydrogen peroxide into the alkaline solution obtained at Step 1 and adjusting pH to 6~10 or by adding one selected from the group consisting of $MgCl_2$, $CaCl_2$, KCl, and NaCl while lowering pH of the alkaline solution obtained at Step 1 to pH 4 or below, and precipitating metal materials of the spent catalyst by adding hydrogen peroxide into a mixture solution of the acidic solution obtained at Step 1 and a supernatant of the alkaline solution after the Si is precipitated, while adjusting pH (Step 2); and removing uranium from the supernatant of the mixture solution after the metal materials are precipitated (Step 3).

An embodiment of the present invention basically uses a method for dissolving spent uranium catalyst in an alkaline solution, taking out undissolved spent uranium catalyst and dissolving the taken, undissolved uranium catalyst in the acidic solution, and optionally their repetition (acid-alkali swing dissolution). Accordingly, it is necessary to know dissolution characteristics of the metal components and the supporter material contained in the spent uranium catalyst.

The U oxide is generally dissolved at high temperature, in strong acid, and in the form of $UO_2^{2+}$. Since the uranium compound oxide distributed in the pores of the porous Si supporter that takes up 50% or more of the catalyst is surrounded by the supporter (Si), efficient dissolution of uranium in the spent uranium catalyst with such an acid solution is not expected. The supporter (Si) of the complex uranium catalyst has very low solubility in acid, while it shows high solubility in the strong alkaline solution. Accordingly, to ensure that the spent uranium catalyst of complex oxides of Si, U, Sb, Fe, Al, Mo, Bi, V is effectively dissolved and that U component is exclusively separated from the uranium complex oxide, it is necessary to know the aquatic characteristic of the main ingredients of the spent uranium catalyst.

Figure 1:
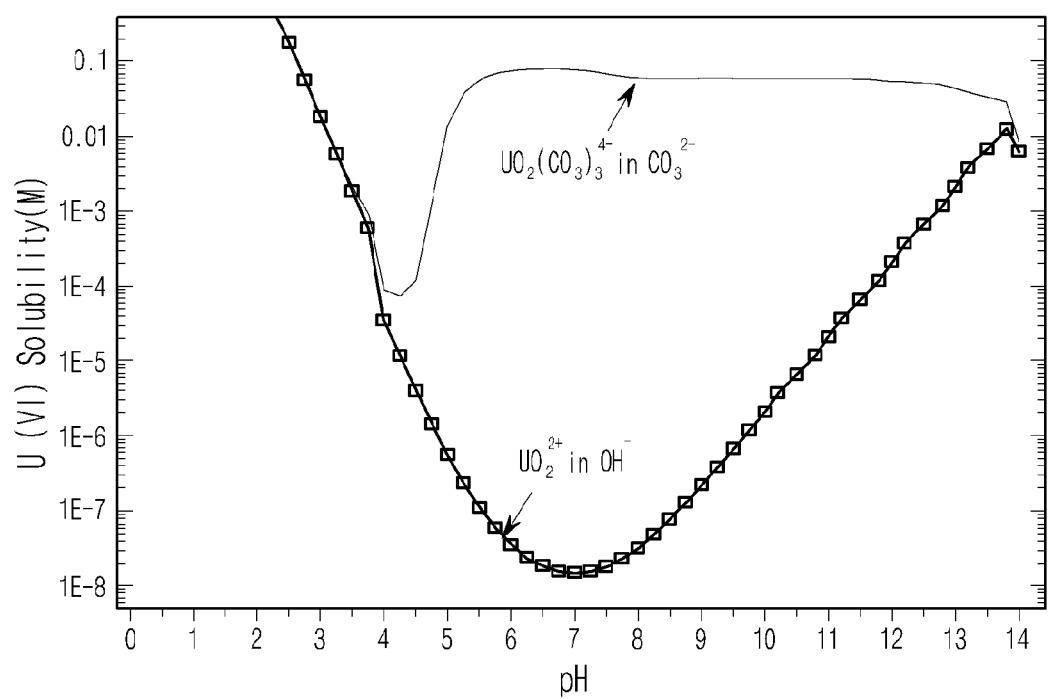
FIG. 1 is a graph showing the solubility of U calculated according to pH in $CO_3^{2-}$ and $OH^-$ solution system.

FIG. 1 is a graph that shows U which is calculated according to pH in $CO_3^{2-}$ and $OH^-$ solution system, with the Murgram, the geochemical code for calculating total uranium solubility in the case where various uranium compounds coexist at the same time. Referring to FIG. 1, U dissolution characteristic will be explained below.

When U is dissolved into $UO_2^{2+}$ form in strong acid, the U solubility exceeds 1M, but as the pH of the solution increases, $UO_2^{2+}$ is hydrolyzed into $UO_2(OH)_x^{2+}$ form, along with which the solubility rapidly decreases from pH 7 to $10^{-8}$ M. However, the solubility gradually increases as pH increases above 7, and rises to approximately $10^{-3}$ M at pH 13 or above. Meanwhile, in carbonate solution with neutral pH or above, $UO_2^{2+}$ forms uranium carbonate complex $(UO_2(CO_3)_3^{4-})$ ion, with solubility rising to approximately 0.08 M, but U solubility again decreases in carbonate solution with pH 13 or above. When hydrogen peroxide $(H_2O_2)$ exists in pH 9~12 carbonate solution, U is changed into uranium oxo carbonate complex, $UO_2O_2(CO_3)_2^{4-}$ which has far stronger binding than $UO_2(CO_3)_3^{4-}$ complex formed in carbonate solution without hydrogen peroxide, with the U solubility greatly increasing to approximately 0.34 M. The uranium carbonate complex exists only at pH 6 or above, so that carbonate ion turns into $CO_2$ and begins to escapes from the carbonate complex under pH 6 and completely escapes from the solution under pH 4, $UO_2(CO_3)_3^{4-}$ changing in the form of $UO_2^{2+}$ ion, and $UO_2O_2(CO_3)_2^{4-}$ changing in the form of $UO_2(O_2)$ precipitate.

Figure 2:
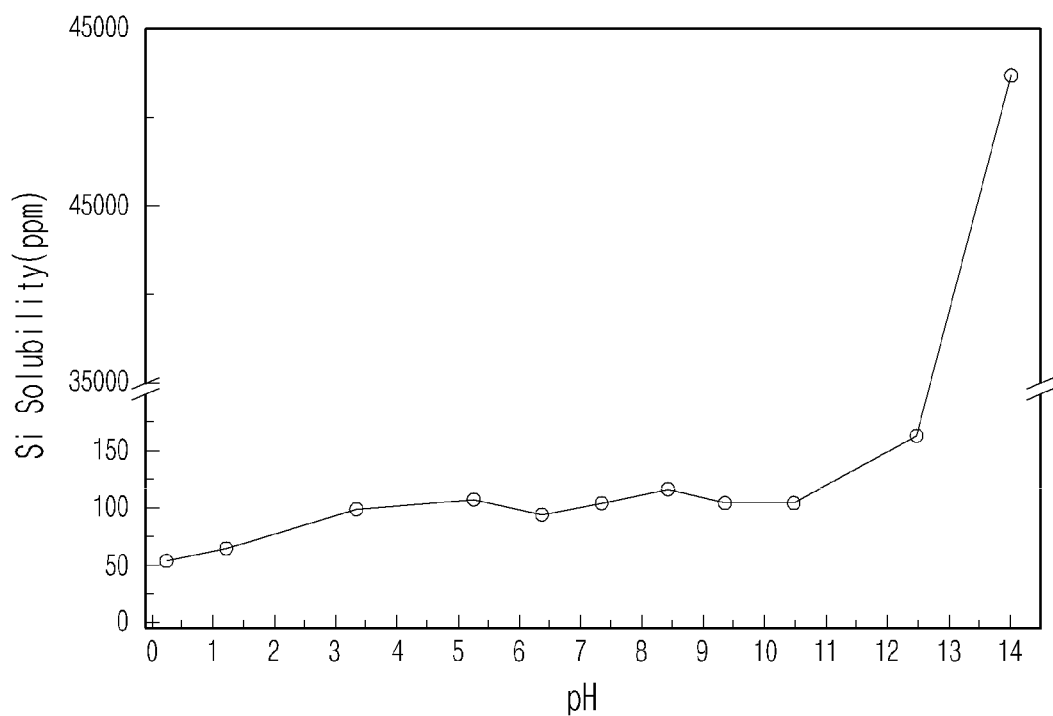
FIG. 2 is a graph showing the solubility of Si measured according to pH, according to an embodiment of the present invention.

FIG. 2 is a graph illustrating a Si solubility as measured according to pH, according to an embodiment of the present invention.

Si, which exists in $SiO_2$ form in uranium complex oxide, is dissolved into the silicic acid $(H_4SiO_4)$ ions $(H_3SiO_4^-, H_2SiO_4^{2-}, HSiO_4^{3-})$ or these can be expressed as $Si(OH)_x^y$, with the solubility at pH 0~10 ranging between $10^2$~$10^{-3}$ M, but then rapidly increasing to 1~2 M at pH 10 or above. The solubility of FIG. 2 is similar to those of the conventional documents.

Accordingly, by adjusting pH of the solution, it is possible to precipitate Si dissolved in strong alkali into $H_4SiO_4$ (Si(OH)$_4$) form, and it was reported that Si precipitate is complicatedly with different precipitation rates, precipitation induction times, and precipitate morphologies, depending on the temperature, pH, pressure, ionic strength and stirring condition of the solution.

In other words, Si has such characteristic that its precipitation exhibits complicated behaviors such as $SiO_2$ particles or $Si(OH)_x$-polymerized gel, depending on the conditions of precipitation.

FIGS. 3 to 8 are graphs showing solubility of Fe, Al, Sb, Mo, V and Bi according to the respective pHs (The hydrolysis of cations, Rober E, Kriger Pub. Co. Florida (1986)). The above document lists ion species and solubility of Fe, Al, Sb, Mo, V, Bi according to pH. Referring to FIGS. 3 to 8, (x, y) represents a combination of corresponding metal ion that binds metal ion species (Mx(OH)y; M=Fe, Al, Mo, V, Bi) and stoichiometric value of the hydroxide, according to which ion number of the ion species is determined.

Figure 3:
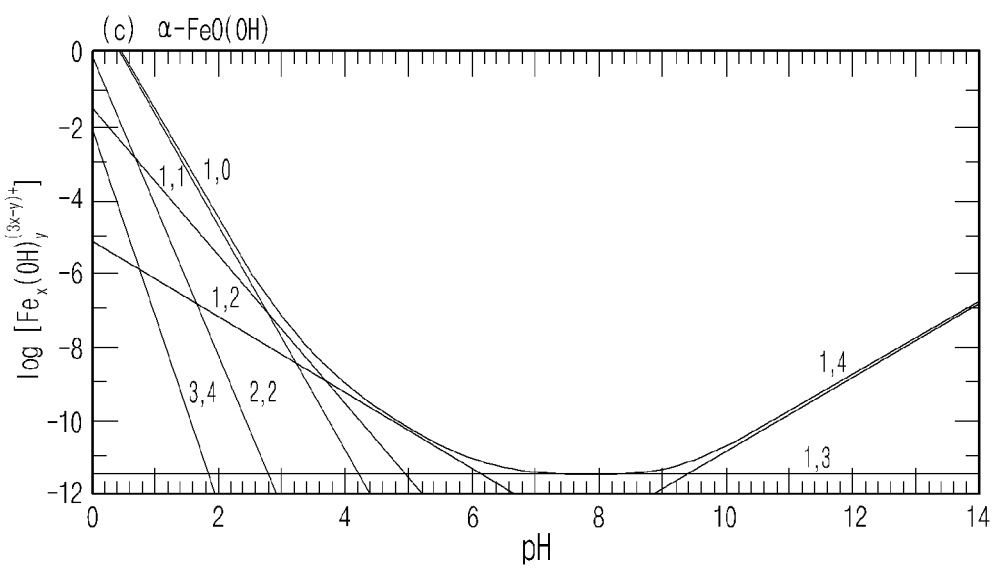
FIGS. 3 to 8 are graphs showing the respective solubilities of Fe, Al, Sb, Mo, V, and Bi according to pH.

Referring to FIG. 3, Fe in trivalent (+3) state exists in $Fe(OH)_3$ form at pH 6~9, with the solubility greatly decreasing to about $10^{-12}$M, but it exists in various forms of cation at pH 6 or below, with the solubility greatly increasing to exceed 1M at pH 0. On the contrary, Fe in trivalent (+3) state exists in $Fe(OH)_4^{-\ anion\ form\ at\ pH}$ 8 or above, with solubility increasing to reach approximately $10^{-7}$ M at pH 14.

Figure 4:
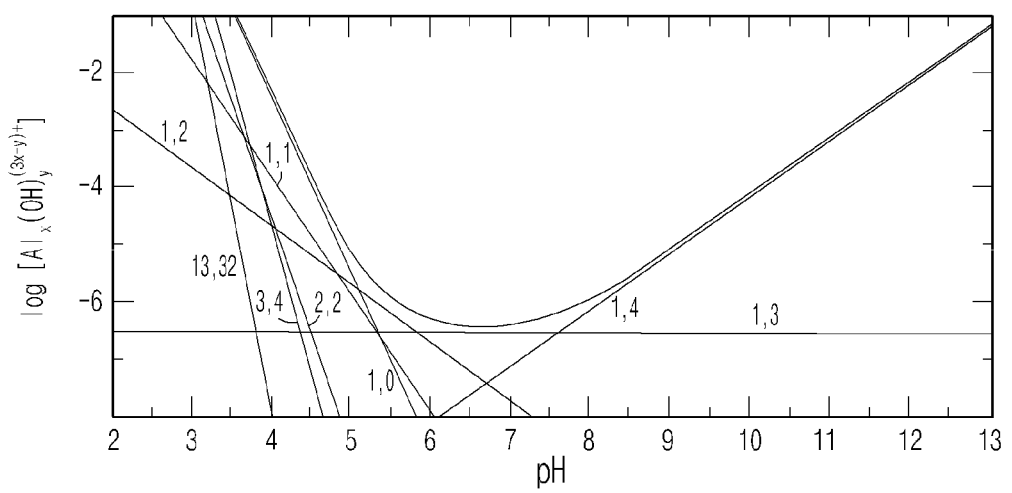

Referring to FIG. 4, Al in +3 state shows similar behavior as Fe of FIG. 3, and accordingly, it exists in the form of $Al(OH)_3$ at pH 6~7, with solubility greatly decreased to about $10^{-6}$ M, but this exists in various forms of cation of $Al_x$ $(OH)_y^{z+}$ at pH 6 or below, with solubility greatly increasing to exceed 1M at pH 0. On the contrary, the Al in +3 state exists in the form of $Al(OH)_4^-$ anion at pH 8 or above, with solubility increasing to approximately $10^{-1}$ M at pH 13 or above.

Figure 5:
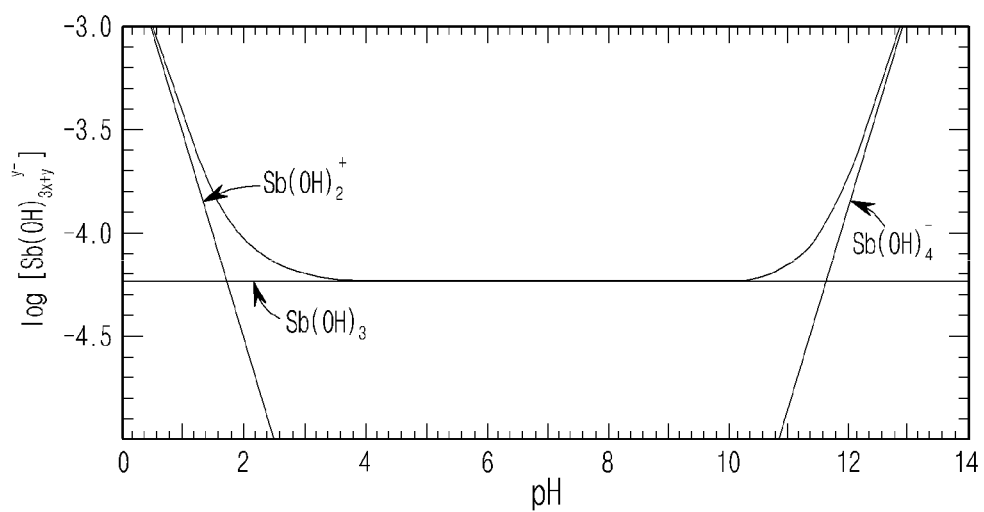

Referring to FIG. 5, Sb is in the form of $Sb(OH)_2^+$ at pH 3 or below, $Sb(OH)_4^-$ at pH 10 or above, with solubility exceeding approximately $10^{-2}$ M at pH 0, 14, but $Sb(OH)_3$ has solubility decreasing to below $10^{-4}$ M at pH 3~10.

Figure 6:
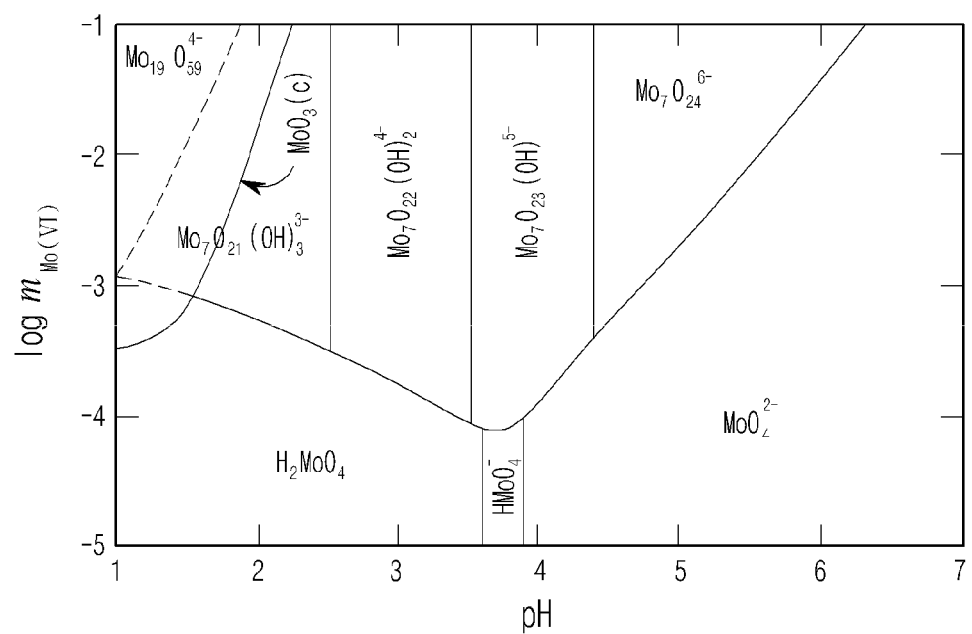

Referring to FIG. 6, hexavalent Mo shows still more complicated behavior, so that this precipitates into the form of $H_2MoO_4$ in the approximately 0~4 pH range with solubility below $10^{-3}$ M, but exists in the form of $MoO_4^{2-}$ at pH 4 or above. The solubility also increases to 1 M at pH 10 or above. With Mo concentration of $10^{-3}$ M or above in the solution, the molecular weight is considerably large in the entire pH range, complicated anion form is present, and the solubility greatly increases. At the proximity to pH 0, Mo exists as $H_2MoO_4$ or $MoO_3$, with solubility or $10^{-3}$M or below, but when $H^+$ in the solution increases to above 1M, Mo exists in the form of $MoO_2(H2O)_2^{2+}$ ion, with increasing solubility so that the solubility increases to or above $10^{-1}$ M when $H^+$ concentration increases to or above 2 M. Accordingly, it is known that Mo has very complicated forms and various solubility depending on the acidity of the solution.

Figure 7:
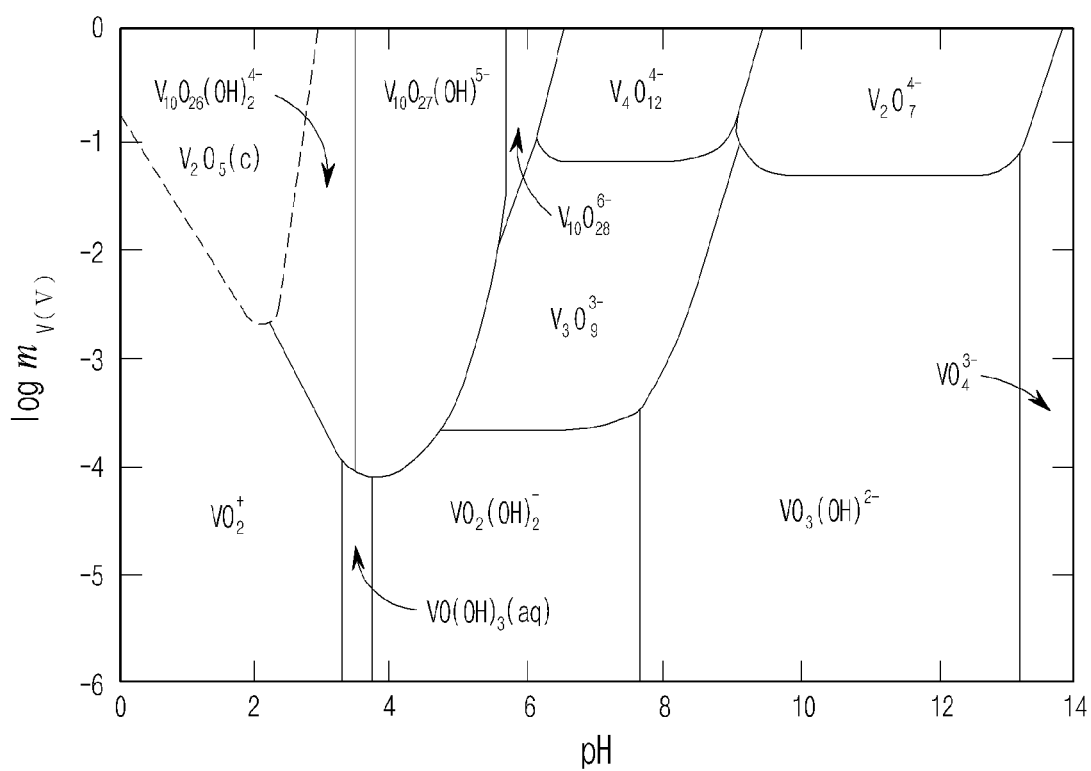

Referring to FIG. 7, V exists as ions of various oxidation numbers including +2, +3, +4, +5 according to redox potential condition, also exists as various ion species according to pH of the solution and V concentration of the solution, and has very complicated solubility characteristic over the entire pH range.

Figure 8:
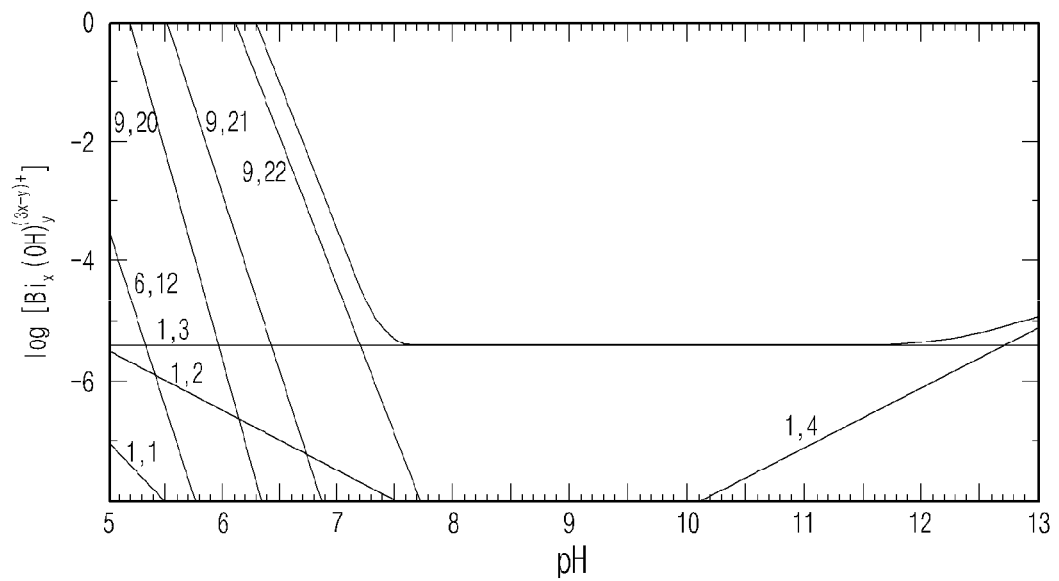

Referring to FIG. 8, Bi exists in various forms of $Bi_x(OH)_y^{z+}$ at pH 8 or below, and has rapidly increasing solubility as pH decreases, so that at pH 0, $OH^-$ component is polymerized to form such as $Bi_9(OH)_{22}^{5+}$ with very large molecular weight with considerably increasing solubility.

As explained above, U, Sb, Fe, Mo, V, Bi and Si present in spent uranium catalyst exhibit respectively different behaviors in acidic solution and alkaline solution. Due to such characteristics of U, Sb, Fe, Mo, V, Bi and Si in solution, it is not possible to efficiently reduce the volume of spent uranium catalyst by dissolving Si supporter-carrying $U_wSb_xM_yO_z$ (M=one or more selected from among Fe, Al, Mo, V, Bi, where, w, x, y, z represent molar ratio of constructing oxide) in a single dissolution solution system.

The method for treating spent uranium catalyst containing the various metals and supporter material (Si) will be explained step by step, based on the above-mentioned characteristics.

Figure 9:
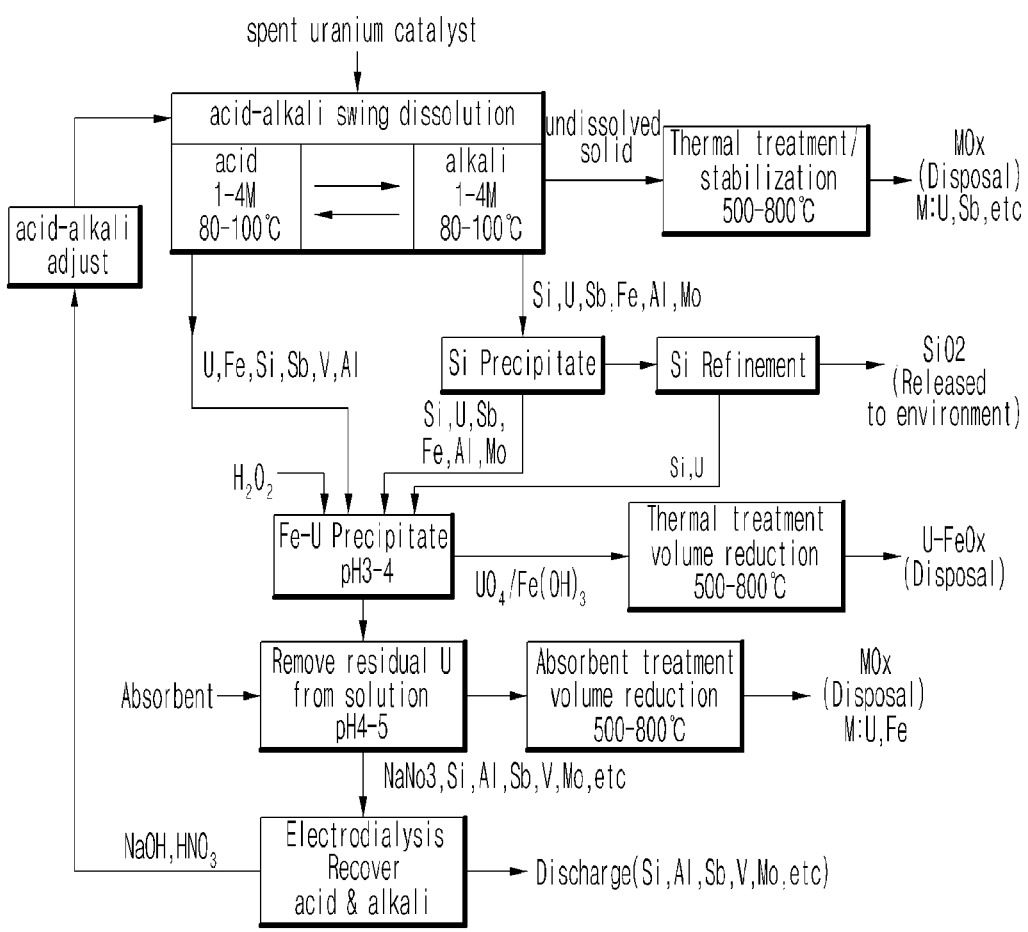
FIG. 9 is a flow chart of the treatment process of the spent uranium catalyst according to an embodiment of the present invention.

FIG. 9 is a flowchart illustrating a process of treating spent uranium catalyst according to an embodiment of the present invention.

The process of treating spent catalyst according to an embodiment of the present invention will be explained below with reference to FIG. 9.

In one embodiment, at Step 1, spent uranium catalyst is dissolved in alkaline solution with mixing, and undissolved spent uranium catalyst is taken out and then consecutively dissolved in acidic solution. To be specific, when the spent uranium catalysts are put in the acidic solution, the metal components bonded with the supporter of the spent uranium catalyst are dissolved and come out into the solution. At this Step, considering that the dissolution of the metal components is not sufficient to achieve volume reduction, the dissolution of the supporter is further performed with repeating the acid-alkali swing dissolution.

The spent uranium catalyst generally includes metal component such as Fe, Al, Mo, V, Bi in oxide form combined with the supporter Si. Referring to FIGS. 3 to 8, solubility of Fe, Al, Sb, Mo, V, Bi is high in acidic solution.

For the purpose of increasing solubility to acidic solution, it is desirable to heat the dissolution solution at 80~100° C. This is because the metals, which are in solid state, generally show high solubility in solution at high temperature.

However, it is not sufficient to dissolve the supporter and also reduce the volume solely by dissolving only the metals among the components of the spent uranium catalyst.

Accordingly, to effectively achieve dissolution of the spent uranium catalyst, dissolution of supporter of the spent uranium catalyst in alkaline solution is necessary.

Si is generally used as a supporter for the spent uranium catalyst.

Referring to FIGS. 2 to 8, unlike the other metals, Si shows high solubility in strong alkaline solution.

Accordingly, according to an embodiment of the present invention, it is possible to achieve desired volume reduction by conducting a process of dissolving and thus separating a material such as Si which plays a role of supporter with respect to the spent uranium catalyst.

To ensure that dissolution with respect to the spent uranium catalyst is performed efficiently, it is desirable to perform the dissolution process while heating at 80~100° C.

Although not explained above, the effect of doing as explained above is facilitated when Si is used as the supporter for the spent uranium catalyst, due to porosity thereof.

The spent uranium catalyst is preferably in such a form that Si supporter carries $U_wSb_xM_yO_z$ (M=one or more selected from among Fe, Al, Mo, V, Bi, where, w, x, y, z represent molar ratio of constructing oxides).

The spent uranium catalyst includes Si supporter, which takes up approximately 50% or more of the total weight of the uranium catalyst, and catalyst component $(U_wSb_xFe_aAl_b\text{-}Mo_cV_dO_z)$ (a+b+c+d=y, a, b, c, d respectively represent molar ratio of constructing Fe, Al, Mo, V), which are strongly chemical-bonded to one another.

Accordingly, to dissolve the spent uranium catalyst, a process of dissolving Si component in alkaline solution and dissolving the catalyst component $(U_wSb_xFe_aAl_bMo_cV_dO_z)$ is necessary.

Referring to FIGS. 3 to 8, since the catalyst component $(U_wSb_xFe_aAl_bMo_cV_dO_z)$ exhibits good solubility in acidic solution, desired volume reduction is achieved by performing dissolving in acidic and alkaline solutions respectively.

The acidic solution may preferably use any one selected from the group consisting of nitric acid, sulfuric acid, hydrochloric acid, hydrofluoric acid and phosphoric acid. The molar concentration of the acidic solution may preferably range between 1~4M.

In one embodiment, after the dissolution of the metal components of the spent uranium catalyst in the acidic solution, Si, the supporter material of the undissolved spent uranium catalyst in the acidic solution, is required to be then dissolved. While the Si dissolution mainly takes place in the alkaline solution rather than metal components, the metal components such as Fe, Al, Sb, Mo, V and Bi also dissolve in the alkaline solution to some extent.

Referring to FIG. 2, Si has higher solubility in the alkaline solution. To be specific, and as explained above, when dissolved, Si is dissolved into silicate form, with solubility, which is approximately $10^{-2}$~$10^{-3}$ M at pH 0~10 pH rapidly increases to 1~2 M at pH 10 or above.

Further, since Si also constitutes solid phase, the solubility of Si can further increased by increasing temperature. Accordingly, it is desirable to maintain the alkaline solution at 80~100° C. to increase Si dissolution rate.

The alkaline solution may use any one selected from the group consisting of sodium hydroxide, potassium hydroxide, lithium hydroxide and ammonium hydroxide. The molar concentration of the alkaline solution may preferably be 1~4 M.

In one embodiment of the present invention, a method for treating spent uranium catalyst may desirably perform Step 1 repeatedly, for the reasons explained below.

Si, which is the supporter material of the uranium catalyst, has high solubility in the alkaline solution. Accordingly, when the spent uranium catalyst is first dissolved in the alkaline solution, Si component would mostly escape from the surface of the catalyst particles, mainly leaving $U_wSb_xFe_aAl_bMo_cV_dO_z$ on the surface layer of the particles, which would hinder continuous contact between Si inside the catalyst and the alkaline solution. At this situation, U, Sb, Fe, Al, V, Mo, which has some solubility in alkaline condition, are partially dissolved along with Si. If the undissolved particles are transported to and dissolved in the acidic solution, rather than left to dissolve in the alkaline solution, mainly U and Fe can be effectively dissolved from the exposed $U_wSb_xFe_aAl_bMo_cV_dO_z$ layer of the surface, also with the metals with some solubility being dissolved to acidic solution, leaving the $U_wSb_xFe_aAl_bMo_cV_dO_z$ layer to a greatly dissolved state from the original state. As a result, the catalyst particle surface is changed from the state of acid-favorable for dissolution to the state of alkali-favorable for dissolution where the catalyst surface is covered by a layer that mainly includes Si with low solubility to acidic condition.

In such a state, the continuous attempts to dissolve the undissolved catalyst in the same solution would cause resistance to diffusion of acid solution into inner layer of the undissolved catalyst due to the Si-dominant layer, which results in hard dissolution of the still-undissolved uranium catalyst. Accordingly, it is desirable to repeat the process of dissolving the spent uranium catalyst in the acidic solution, taking out the undissolved spent uranium catalyst, and dissolving it in the alkaline solution.

The above process can be called 'acid-alkali swing dissolution', according to which the supporter material such as Si is mainly dissolved in the alkaline solution from the spent uranium catalyst containing Si, Sb, Fe, Al, Mo, V and Bi oxides, while the dominant metal components such as U and Fe are dissolved in the acidic solution, thereby providing effective dissolution of the spent uranium catalyst.

Figure 10:
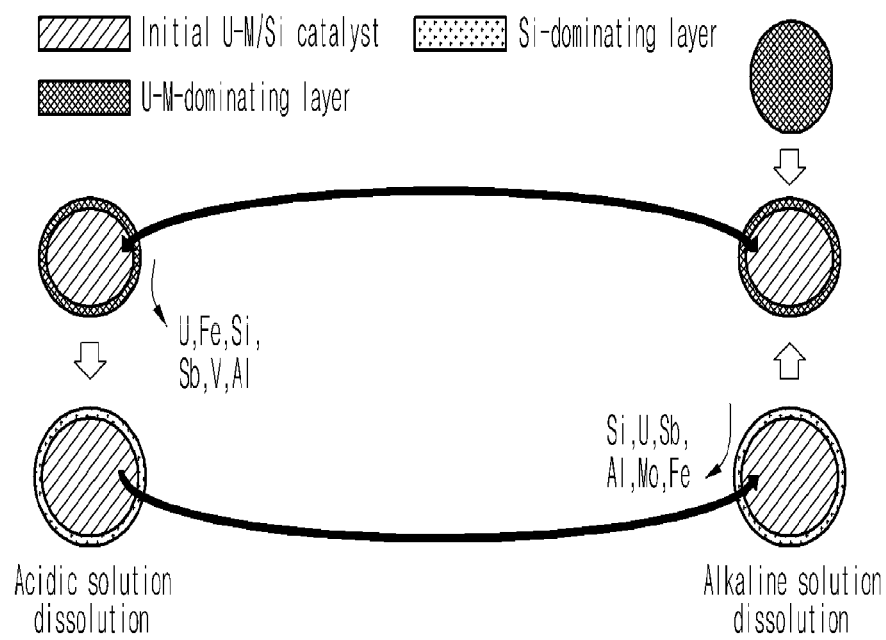
FIG. 10 is a schematic, conceptual view of acid-alkali swing dissolution according to an embodiment of the present invention.
Figure 11:
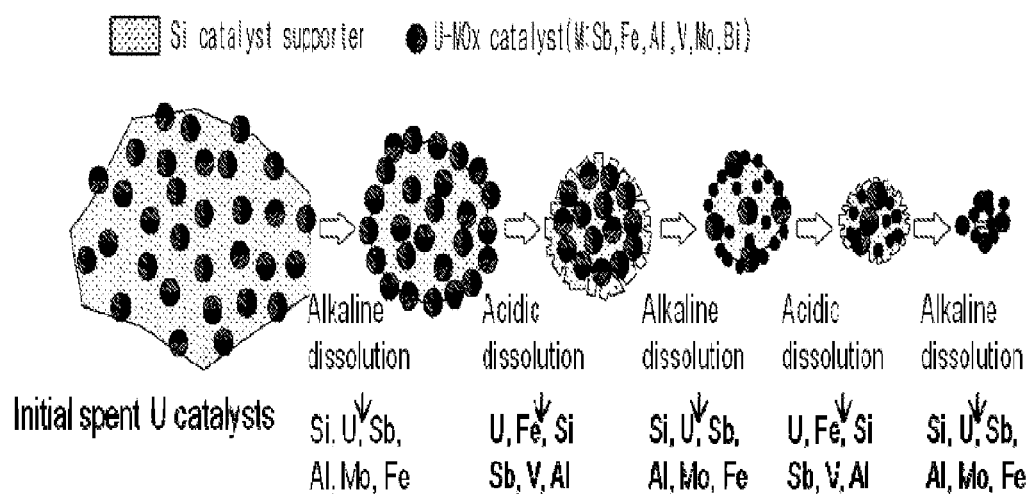
FIG. 11 is a schematic view illustrating the volume reduction of the spent uranium catalyst during the acid-alkali swing dissolution according to an embodiment of the present invention.

FIG. 10 is a schematic, conceptual view provided to explain the acid-alkali swing dissolution according to an embodiment of the present invention, and FIG. 11 is a schematic, conceptual view of volume reduction of the spent uranium catalyst by the acid-alkali swing dissolution according to an embodiment of the present invention.

Referring to FIGS. 10 and 11, the spent uranium catalyst particle volume is effectively decreased by the dissolution, as the acid-alkali swing dissolution is performed, according to which undissolved particles after acidic dissolution is transported to and dissolved in the alkaline solution.

To increase the dissolution rate of the spent uranium catalyst in the respective dissolution steps, it is desirable to heat the solutions to bed used for dissolution in atmospheric condition. However, considering workability and stability of the operation, it is more preferable to heat at 100° C. or below.

It is preferable to use the same alkaline solution and same acidic solution in the acid-alkali swing dissolution, because the ions such as Si, Sb, V, Al, Fe, Mo dissolved in the alkaline solution and ions such as U, Fe in the acidic solution already have sufficiently high solubility in the initial strong acid (1~4M), and initial strong alkaline solution (1~4M). The acidic solution as used does not have S, P solid components, and may preferably use any the acid selected from the group consisting of nitric acid, sulfuric acid, hydrochloric acid, hydrofluoric acid, and phosphoric acid.

Further, the alkaline solution used in the alkali dissolution may preferably be selected from the group consisting of sodium hydroxide, potassium hydroxide, lithium hydroxide, and ammonium hydroxide.

It is preferable that, after Step 1, a step of thermally treating the undissolved spent uranium catalyst is additionally included.

There can be spent uranium catalyst that remains undissolved even after the acid-alkali swing dissolution as explained above. Such undissolved spent uranium catalyst may be completely dissolved via dissolution that uses far stronger acidic solution in consideration of complexity, economic aspect or volume reduction of the spent uranium catalyst by the dissolution from the point of the treatment, or disposed in consideration of simplicity and economic aspect of the dissolution process.

When the spent uranium catalyst is the undissolved solid, considering possible presence of carbon compounds and nitrogenous compounds remaining undissolved in the acidic and alkaline solutions, the remaining solids may be heated at air atmosphere to vaporize the carbon and nitrogenous components to thus contribute to the reduction of volume and weight of the undissolved solids to be finally disposed.

The thermal treatment may be preferably performed at 500~800° C., because such carbon and nitrogen components may not be sufficiently decomposed as carbon dioxide and nitrogen gases below 500° C., while it is not economically recommendable to heat beyond 800° C. Accordingly, for the purpose of thermal treatment of the undissolved solids, it is preferable to heat the same at 500~800° C. and vaporize the same.

When the undissolved spent uranium catalyst is disposed after thermal treatment, because the remained metal components are changed into stable oxide state and the carbon and nitrogen components are eliminated, the generation of secondary waste is advantageously reduced.

Further, the uranium catalyst can be contaminated with various impurity materials which can be synthesized with carbon and nitrogen components, etc. in the process of producing acrylonitrile, which results in impurity materials remaining in the spent uranium catalyst. The impurities can fill up the pores of the spent uranium catalyst and surround the Si supports and the catalyst components, thus preventing dissolution of the U, Si and other components in acidic solution or alkaline solution.

Experimental Example 1 investigated the above-mentioned effect by conducting thermal gravity analysis of the spent uranium catalyst.

According to Experimental Example 1, absence of thermal treatment before acid-alkali swing dissolution is considered proper, and the process for treating spent uranium catalyst according to an embodiment will be explained below with reference to an example where the thermal treatment is not performed before the acid-alkali swing dissolution of Step 1.

Although solubilities of the respective components increase as the concentrations of acidic solution and alkaline solution for the dissolution increase, considering possible shortcoming associated with the strong acidic and alkali conditions such as corrosion of the equipment, or considering maximum concentration of acidic, and alkaline solutions to be recovered by electrodialysis from the acid-alkali alkali mixture solution which is finally generated as a result of treating the spent uranium catalyst, the concentrations of the acidic solution and the alkaline solutions for use in acid-alkali swing dissolution are desirably 4M or below.

According to the present invention, Step 2 relates to adding carbonate and hydrogen peroxide to the alkaline solution obtained at Step 1, precipitating Si, which is the supporter material of the spent catalyst, by adjusting to pH 6~10, adding hydrogen peroxide to the mixture solution of the acidic solution obtained at Step 1 and alkaline supernatant solution obtained after precipitation of the supporter material (Si) of the spent catalyst to thus precipitate the metal materials of the spent catalyst. To be more specific, Step 2 exclusively induces precipitation of the supporter material (Si) by lowering the pH of the alkaline solution to pH 6~10, and preventing co-precipitation of U with the supporter material, and leaving U in ionic state by selectively adding carbonate and hydrogen peroxide. In that solution, uranium exists in the form of uranium oxo carbonate complex, $UO_2O_2(CO_3)_2^{4-}$, but dissolved supporter material, Si is precipitated. Also the Step 2 has another precipitation step, which is to adjust pH of the supernatant mixture solution of the acidic solution obtained at Step 1 and the alkaline supernatant solution generated after above precipitation of Si to 3~4, and adds hydrogen peroxide to thus precipitate uranium peroxides from the mixture solution. Uranium exists in the form of uranyl ion of $UO_2^{2+}$ in acidic condition such as pH 3~4, and when hydrogen peroxide is added in the solution, the uranyl ion is precipitated as uranyl peroxide of $UO_2(O_2)$.

As another way to precipitate the dissolved supporter material (Si) in the alkaline solution, it is possible to lower the pH of the alkaline solution obtained at Step 1 to below 4, and add any one selected from the group consisting of $MgCl_2$, $CaCl_2$, KCl and NaCl, thus precipitating the supporter material (Si) as a form of $H_4SiO_4$.

The alkaline solution generated in the process of the acid-alkali swing dissolution generally includes supporter material (Si), and part of metal materials such as U, Fe, Al, Sb, Mo and other impurity metal ions. Further, the acidic solution generally include, in dissolved state, metal materials such as, mainly, U, Fe, and part of supporter material, Si, and other metal materials. Accordingly, unless U or Si are selectively isolated from the acidic solution and the alkaline solution, and the U concentration in the dissolution solutions, or U concentration of the isolated supporter material (Si) in the precipitate is lowered to below a level to be acceptable for the solutions and Si precipitate to be released to environment, regardless of whether the spent uranium catalyst is dissolved or not, the solution used for the dissolution, or the supporter material isolated from the spent catalyst entirely return to radioactive waste. Accordingly, it is necessary to lower U amount to be less than 1 ppm in the alkaline solution and acidic solution in which the metal materials and the supporter material are dissolved.

The process of treating alkaline solution relates to adjusting pH of the alkaline solution to 6~10, and adding carbonate and hydrogen peroxide to precipitate the dissolved supporter material (Si) of the spent catalyst.

If the spent uranium catalyst is dissolved in approximately pH 14 alkaline solution, due to higher solubility of Si, the Si concentration can be several thousands of ppm. On the other hand, U is dissolved to $UO_2(OH)_x^{y-}$ form by approximately $10^{-3}$ M (approximately, 200 ppm) due to its low solubility. To isolate Si from the alkaline solution containing Si dissolved therein, referring to FIG. 2, pH is lower to below 10, because solubility of Si greatly decreases at pH 10 or below. With pH lowered to or below 10, most Si can precipitate in the alkaline solution. However, because solubility of U also decreases in the above pH condition (see FIG. 1), Si and U are subject to co-precipitation so that the Si precipitate entirely turns to radioactive waste.

Two methods may be mainly suggested to isolate U from Si.

First, referring to FIG. 2, since Si has less than 200 ppm solubility between pH 0~10, most Si can be isolated as the precipitate from the solution by adjusting pH of the used alkaline solution to or below 10. To precipitate Si from the alkaline solution, while retaining U in the solution, first, referring to FIG. 1, carbonate is added to the alkaline at pH 6~10 range at which Si has lower solubility, and as the dissolved U forms uranium carbonate ion complex ($UO_2(CO_3)_3^{4-}$) with high solubility of about 20 g/L, Si precipitates in the solution at pH 6~10, while U remains in the solution in the form of $UO_2(CO_3)_3^{4-}$ ion.

The carbonate of Step 2 may desirably be sodium carbonate ($Na_2CO_3$), but not limited thereto.

Accordingly, by adding $Na_2CO_3$ to the solution, when adjusting the alkaline solution containing the spent uranium catalyst dissolved therein to pH 6~10, it is possible to precipitate most Si in the alkaline solution in the form of $Si(OH)_4$, while retaining uranium in the solution.

However, when material such as Fe and Al dissolve along with Si and U from the spent uranium catalyst in the alkaline solution, referring to FIGS. 3 and 4, when Si is precipitated in the alkaline solution at adjusted pH 6~10, Fe and Al ions precipitate to the form of $Fe(OH)_x$, $Al(OH)_x$ with considerably lowered solubility. Furthermore, since the precipitating metal hydroxides have coagulation with the metal ions, this will cause the anion ($UO_2(CO_3)_3^{4-}$) coexisting in the solution to coagulate into $Fe(OH)_x$. $Al(OH)_x$ precipitate structures and undergo co-precipitation with Si. Therefore, it is difficult to precipitate pure Si free of U from the solution.

It is possible to adjust the alkali solution of the spent uranium catalyst dissolved at pH 14 or above in the acid-alkali swing dissolution to pH 9~10 or below, and at the same time, add $Na_2CO_3$ to the solution, to change the co-dissolved U to the form of $UO_2(CO_3)_3^{4-}$ and then additionally add hydrogen peroxide, $H_2O_2$ to again change $UO_2(CO_3)_3^{4-}$ to $UO_2(O_2)(CO_2)_2^{4-}$ form, to thus suppress chemical coagulation by the Fe, Al ions that are co-dissolved with U. As a result, while Si precipitates, U remains in the form of $UO_2(O_2)(CO_3)_2^{4-}$, so that only Si precipitate in the $Si(OH)_4$ form.

$UO_2(O_2)(CO_3)_2^{4-}$ ion complex has considerably greater stability constant than $UO_2(CO_3)_3^{4-}$, and from the viewpoint of redox potential of $H_2O_2$ and Al, Fe ions, $H_2O_2$ can reduce $Al^{3+}$ to $Al^0$, disallowing Al ions from existing in $Al(OH)_x$ form, while the presence of $H_2O_2$ in the solution can oxidize $Fe^{3+}$ to $6+FeO_4^{2-}$ form, thus eliminating chemical species of $Fe(OH)_x$, $Al(OH)_x$ with coagulativity, and allowing U to exist in the form of $UO_2(O_2)(CO_3)_2^{4-}$. Accordingly, it is possible to adjust the alkaline solution, dissolved at pH 14 or above, first to about pH 12, add $Na_2CO_3$ and $H_2O_2$ and change co-dissolved U to the form of $UO_2(O_2)(CO_3)_2^{4-}$, and then again adjust to pH 6~10, to retain U in the solution, while precipitating most Si in the form of $Si(OH)_4$.

Further, while there is no chemical coagulation of Fe, Al, possibility is that U can be physically captured into the Si precipitate structure and partially undergo co-precipitation with Si. In this case, U can be removed by the refinement process involving redissolution-reprecipitation of the Si precipitate, which gives pure Si precipitate only. That is, to obtain pure Si precipitate only to be released to environment, it is possible to repeat the redissolution and reprecipitation one to three times, to thus refine Si precipitate by releasing U from the Si precipitate, in which the redissolution may be conducted in a manner such that $Si(OH)_4$ precipitate with contaminated U is dissolved in alkaline solution of pH 14 or above as in the case of initially dissolving the spent uranium catalyst, and the reprecipitation may include adjustment to pH 12, addition of $Na_2CO_3$ and $H_2O_2$, and another adjustment to pH 6~10.

As another way, it is possible to lower pH of the alkaline solution obtained at Step 1 to 4 or below, and add any one selected from the group consisting of $MgCl_2$, $CaCl_2$, KCl and NaCl, thus precipitating the supporter material (Si) of the spent catalyst.

Referring to FIG. 1, U has rapidly increasing solubility under pH 6, and the U concentration becomes $10^{-3}$ M in the initial dissolution in the alkaline solution at pH 3 or below. Accordingly, by adjusting the alkaline solution containing dissolved uranium catalyst therein to or below pH 4, it is possible to retain U in the acidic solution in the form of $UO_2^{2+}$ ion, while precipitating most Si of the initial alkaline solution.

When $Cl^-$ is added to the alkaline solution containing Si and U, Al etc. dissolved therein with pH lowered to 4 or below, Si precipitates to the form of $Si(OH)_x$, but the entire solution can solidify to the form of Si hydroxide gel due to polymerization of $Si(OH)_x$. In this case, it is possible to precipitate Si ion to $SiO_2$ particles instead of $Si(OH)_x$ gel by stirring the solution during Si precipitation, and also retain U in the form of $UO_2^{2+}$ in the solution, for the purpose of isolating Si from U. To increase precipitation rate of $SiO_2$, Si solution may be heated to about 60° C., and $Cl^-$ ion can be added into the solution. The precipitated $SiO_2$ particles include pores in which $UO_2^{2+}$ ion of the solution is impregnated and likely to contaminate the Si precipitate. Again, it is possible to obtain pure Si precipitate by conducting refinement process which involves redissolution and reprecipitation of the Si precipitate.

According to Experimental Example 7, Si precipitate rate greatly increases to 96%, which can satisfy the condition required for adsorption of the trace of residual U. Since the Si precipitate would partially include coprecipitated U, it is necessary to refine Si precipitate, by the redissolution-reprecipitation process which includes redissolution in alkaline solution of pH 14 or above, and Si precipitation in the abovementioned manner.

However, the refinement process of the Si precipitate obtained under acidic condition has a shortcoming of increased consumption of acid and alkali, and complicated processing due to need for stirring and heating, compared to the refinement process for Si precipitates obtained under the precipitation condition of pH 6~10 carbonate and $H_2O_2$.

After the acid-alkali swing dissolution, the mixture solution of the acidic solution and alkaline solution containing the supporter material (Si) precipitated therein, may be treated in the manner explained below.

The process of treating the mixture solution of the acidic solution and alkaline solution containing the supporter material (Si) precipitated therein, after the acid-alkali swing dissolution, includes adding hydrogen peroxide to precipitate the metal materials of the spent uranium catalyst such as residual Fe and U.

The strong acidic solution, used in the acid-alkali swing dissolution process, includes uranium of high concentration (several hundred ppm: this changes according to solid/liquid ratio when dissolving the spent uranium catalyst) in the form of $UO_2^{2+}$ with less than 200 ppm Si and several-thousand ppm of Fe and a trace of Sb and V being codissolved.

The metal material precipitating in Step 2 is desirably Fe or U.

Referring to FIG. 3, since $Fe^{3+}$ ion has very low solubility at about pH 3~4 ($10^{-4}$~$10^{-8}$ M), most Fe in the solution precipitates in the form of $Fe(OH)_3$. Further, under pH 3~4 acidic condition, $UO_2^{2+}$ ion may precipitate to uranium peroxides ($UO_4xH_2O$) with solubility of about $10^{-3}$ M, by the addition of excess of hydrogen peroxides. However, taking into consideration the proximity of the $Fe(OH)_3$ precipitation pH condition and $UO_4$ precipitation pH condition, likeliness of U contamination of $Fe(OH)_3$ precipitate due to coagulation-accompanying precipitation of the uranium ion by $Fe(OH)_3$, and relatively smaller amounts of $Fe(OH)_3$ and $UO_4$ precipitate compared to the Si precipitate obtained by alkali dissolution, it may be desirable not to selectively isolate $Fe(OH)_3$ and $UO_4$, but simultaneously precipitate both $Fe(OH)_3$ and $UO_4$, to dispose as radioactive waste. In this way, more advantageous operation can be provided, when particularly considering simpler operation due to omission of refinement of $Fe(OH)_x$ precipitate.

Further, when U alone is precipitated to $UO_4$, the U concentration is lower than satisfactory, and in the presence of other ions in large quantity in the solution, $UO_4$ precipitation rate slows down, which will in turn require sufficient settling time. On the contrary, when both U and $Fe(OH)_3$ precipitate simultaneously to $UO_4$ form, U ion is coagulated-precipitated along with $Fe(OH)_3$, so that U precipitation rate accelerates. As a result, the operation time can be shortened, compared to when $Fe(OH)_3$ and $UO_4$ are selectively isolated.

The supernatant of the alkaline solution approximately of pH 6~10, which is generated after Si precipitation from the alkaline solution, contains about 100 ppm U, Si, and a trace of Fe. By mixing this solution with the supernatant of the acidic solution, which is generated after treating acidic solution, it is possible to remove U and Fe by coprecipitation, and also reduce consumption of alkaline solution for the purpose of pH adjustment and amount of additive such as hydrogen peroxide, compared to when U and Fe are precipitated and isolated from the acidic solution only. As a result, more simplified process is provided, to treat the acidic and alkaline solution supernatant.

It is possible to add a step of thermally treating the solid precipitate waste as obtained, after Step 2.

It is desirable to apply the thermal treatment of U—Fe precipitate of mixture of $UO_4$ and $Fe(OH)_3$ for the purposes of further weight and volume reduction and enhancement of disposal stability.

The thermal treatment may desirably be performed at 500~800° C.

Figure 12:
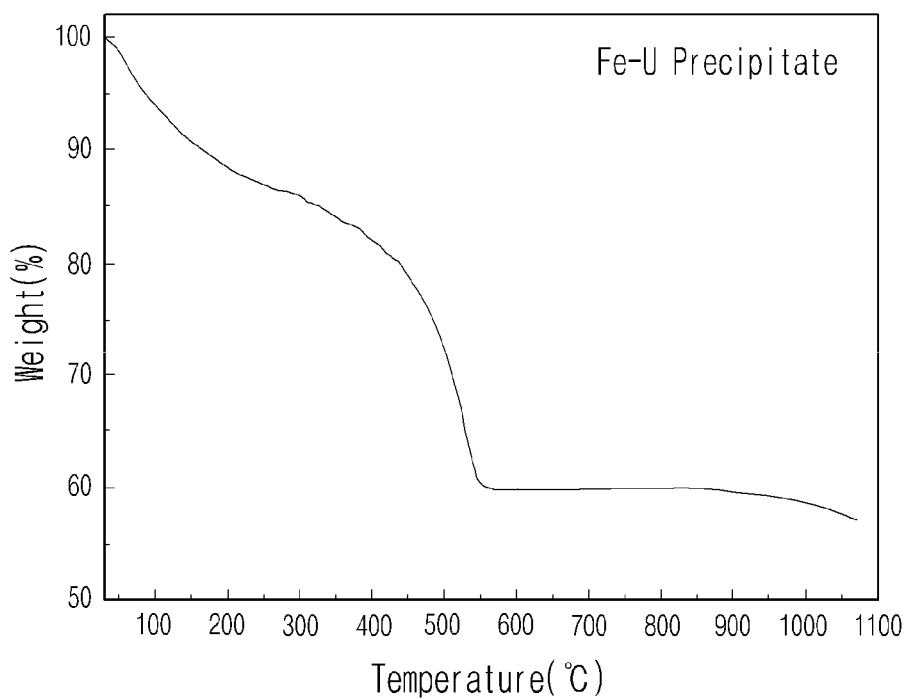
FIG. 12 is a graph showing change in weight of the U—Fe precipitate by thermal gravity analysis according to an embodiment of the present invention.

FIG. 12 is a graph illustrating a result of measuring weight change by thermal gravity analysis of U—Fe precipitate, according to an embodiment of the present invention.

Referring to FIG. 12, additional weight reduction by about 40% is possible at 550° C. or above, compared to initial U—Fe precipitate. It is desirable not to exceed 800° C., because the cost for thermal treatment overweighs the additional effect of weight reduction by the thermal treatment.

In one embodiment of the present invention, Step 3 relates to removing trace uranium from the mixture solution supernatant after precipitation of metal materials (U—Fe) at Step 2.

Although no specific standard has been set on the permissible amount of radioactive liquid waste released into environment, generally, the social consensus formed in the international society including South Korea points to amount of released radioactive to below about $10^{-2}$ Bq/ml, the amount that corresponds to U-238 ion concentration in the solution reaching less than 1 ppm. In the pH 3~4 supernatant of the acidic solution containing spent uranium catalyst dissolved therein, from which Fe and U are removed by precipitation, there are less than about 10 ppm of U, less than 200 ppm of Si, several tens of ppm of Al, several ppm of Fe, Sb being present, while in the supernatant of the alkaline solution containing spent uranium catalyst dissolved therein, from which Si is precipitated and U is precipitated again at pH 3~4, there are less than about 100 ppm of U, less than 200 ppm of Si, and several tens of ppm of Sb, Mo, Al being present.

Removal of uranium at Step 3 may desirably be performed using adsorbent.

The adsorbent may be activated carbon or biosorbent.

Since the adsorbent has lower selectivity to metal ion, this generally adsorbs most of metal ions as well as U. Accordingly, the amount of adsorbent to be used to the solution may vary, depends on the total amount of ions present in the solution.

In one embodiment of the present invention, the biosorbent may cause the metal ion to adsorb back onto the surface, by the action of alginic acid present on the surface. The biosorbent may desirably be any one selected from the group consisting of sea mustard, kelp, and gulfweed.

The biosorbent may have further increased adsorption performance, when treated on its surface with acid.

It is desirable that the adsorbent used at Step 3 may additionally be ignited at 500~800° C. to reduce its final volume to be disposed.

The adsorbent with U adsorbed thereon may be ignited for the purpose of volume reduction, and when ignited at 500~800° C., the biosorbent may have approximately 70~80% of volume reduction, and the activated carbon may have approximately 90% or higher volume reduction.

In terms of U adsorption performance, the biosorbent has relatively greater adsorption than the activated carbon, and therefore, preferably used.

Under 500° C. of ignition, effective volume reduction is not obtained, while over 800° C., unnecessary energy consumption occurs. Accordingly, ignition temperature may preferably range between 500~800° C.

In one embodiment of the present invention, Step 4 relates to injecting uranium-free solution generated from Step 3 into electrodialyzer, and recovering acidic solution and alkaline solution. Step 4 may recover the acidic solution and alkaline solution to be recycled in the treatment process of the spent uranium catalyst, by applying a predetermined voltage to the electrodialyzer where the ion exchange membranes are equipped The electrodialysis is based on the principle that ions is selectively migrated through ion exchange membranes when electrical potential is applied in cation exchange membrane (CEX) or anion exchange membrane (AEX). The migration rate of target ions through the ion exchange membrane depends on valence of the ions in the order of monovalent cation>bivalent cation<<trivalent cation for the cation exchange membrane, and monovalent anion>bivalent anion<<trivalent anion for the anion exchange membrane. The migration rate in electrodialyzer is expressed as in Mathematical Equation 1 below, which has diffusion factor and electrical factors. The diffusion factor is usually negligible so that the migration rate is proportional to the difference of voltages applied between the ion exchange membranes.

$$J_i = D_i \frac{dC_i}{dx} - \frac{n_i F}{RT} D_i C_i \frac{d\phi}{dx}$$ [Mathematical Equation 1]

(Referring to Mathematical Equation 1 above, J, D, C, R, F, n, f, and x represent the movement speed of ion per membrane unit area, diffusion coefficient, ion concentration, gas constant, faraday constant, number of electrons involved in electrochemical reactions, potential, and distance, respectively).

When the uranium-free solution generated from Step 3 is injected into an electrodialyzer as a feed solution, the solution is desalinized as the cations and anions in the solution migrated through the cation exchange membrane and the anion exchange membrane to anode and cathode respectively. The migrated cations and anions become the acidic and alkaline solutions with help of water split reactions at the electrodes. The recovered acidic and alkaline solutions are reused in the dissolution of spent uranium catalyst at Step 1.

The uranium-free solution may thus contain only less than 1 ppm of uranium.

Accordingly, if the solution generated from Step 3 contains uranium below 1 ppm, the solution can be released into environment. However, it is more preferable to re-use the alkaline solution and acidic solution recovered from the solution to minimize the generation of secondary radioactive waste solution in the process of treatment of spent uranium catalyst.

Accordingly, the method for treating the spent uranium catalyst according to an embodiment of the present invention may recirculate the acidic solution and the alkaline solution recovered at Step 4 to Step 1.

The process for the treatment of spent uranium catalyst explained above indicates the following: when the process includes Si and U isolation by the acid-alkali swing dissolution (Step 1), and precipitation of Si or Fe—U with respect to the acidic solution and the alkaline solution, and then refinement of contaminated Si precipitate (Step 2), the precipitation supernatant solution includes a trace of U (possibly, in several ppm). Accordingly, it is considered that the mixture solution supernatant after the precipitation of the metal materials still has rather high radioactivity to be released to the environment.

When the process continues to Step 3 (i.e., adsorption with respect to U ion with biosorbent or activated carbon), the uranium-free solution then contains cation (e.g., $Na^+$) and anion (e.g. $NO_3^-$) remaining therein.

Figure 13:
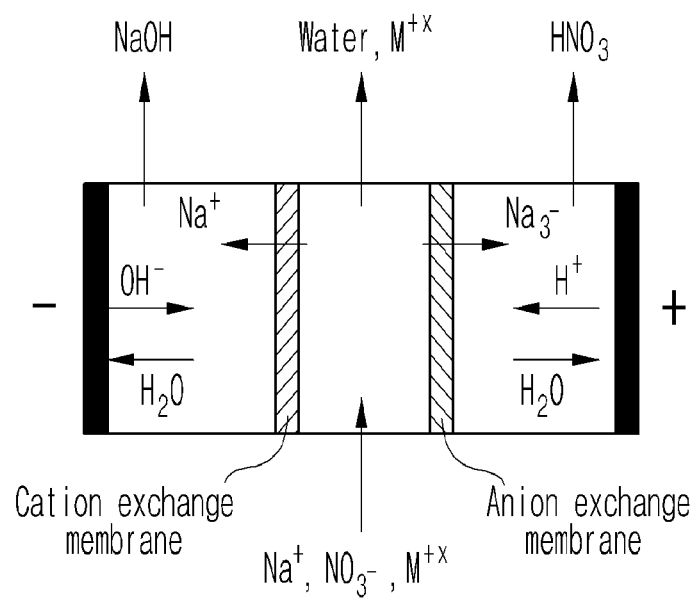
FIG. 13 is a schematic drawing showing an electrodialysis to recover the acidic solution and the alkaline solution from the acidic-alkaline solution generated from the treatment of spent uranium catalyst, according to an embodiment of the present invention.

When the salt solution after Step 3 is injected into electrodialyzer having cation exchange membrane and anion exchange membrane therein, referring to FIG. 13, the salt solution in between the cation and anion exchange membranes undergoes electrolysis as the voltage 5~30V is applied to the electrodes. Under less than 5V voltage, driving force is insufficient to draw $Na^+$ ion toward the cathode, while too much electricity is consumed when the applied voltage exceeds 30V. Accordingly, it is desirable that the external voltage supply may range between 5~30V.

To be more specific, Stage 4 preferably relates to injecting any one selected from the group consisting of sodium hydroxide, potassium hydroxide, lithium hydroxide, and ammonium hydroxide, in between cathode and cation exchange membrane of the electrodialyzer having cation exchange membrane and anion exchange membrane installed therein, injecting uranium-free solution in between the cation and anion exchange membranes, and injecting any one selected from the group consisting of nitric acid, sulfuric acid, hydrochloric acid, hydrofluoric acid, and phosphoric acid, in between the anion and cation exchange membranes, and applying 5~30V voltage to electrolyze water and recovering acidic solution in anodic chamber and alkaline solution in cathodic chamber.

As explained above, when the external voltage is applied, the cathode does not have $Na^+$ reduction, but has $H^+$ ion reduction, while the anode does not have $NO_3^-$ oxidation, but has $OH^-$ oxidation. As a result, oxygen gas ($O_2$) is generated.

In the embodiments of the present invention, since the method for treating spent uranium catalyst may recycle the alkaline solution and acidic solution back to the uranium treatment process, generation of the secondary waste due to the recycle of alkaline solution and acidic solution can be kept minimum, and the process according to the embodiments can provided increased environmental-friendliness.

Hereinafter, the present invention will now be described in greater detail with examples. But, the following examples are intended only to be illustrative, and not to limit the scope of the claims.

Example 1

Treatment of Spent Uranium Catalyst 1

Step Spent uranium catalyst was dissolved in alkaline solution, and the spent uranium catalyst undissolved was taken out and dissolved in acidic solution.

Initial 10 g of spent uranium catalyst was put into the alkaline solution (1M NaOH 100 ml at 100° C.) to be dissolved, and the spent uranium catalyst undissolved was taken out and then be put and dissolved into the acidic solution (1M $HNO_3$ 100 ml at 100° C.) The components of the spent uranium catalyst include Si 31.1 wt %, Sb 15.3 wt %, U 3.13 wt %, Fe 6.44 wt %, Na 2.0 wt %, Al 0.79 wt %, V 0.62 wt %, S 0.43 wt %, Mo 0.41 wt %, Ni 0.27 wt %, Ca 0.17 wt %, and Mg 0.19 wt %. The mass ratio of the components can be found through Experimental Example 3.

The acid-alkali swing dissolution process was repeated 3 times and each dissolution was performed for 4 hours so that the dissolutions were desirably performed in the acidic solution and the alkaline solution.

Step 2: Si, a supporter material of the spent catalyst, was precipitated the alkaline solution obtained at Step 1, and metal materials of the spent catalyst were precipitated by adding hydrogen peroxide, while adjusting pH, to a mixture solution of the acidic solution obtained at Step 1 and a supernatant of the alkaline solution after the Si was precipitated.

The Si was precipitated by putting $HNO_3$ solution to adjust to pH to 8 after adding both $Na_2CO_3$ and $H_2O_2$ to the above alkaline solution.

This refining process was repeated 3 times.

Further, the acidic solution was mixed with a supernatant of the alkaline solution after the Si precipitation. The pH of the mixture solution of the acidic solution and the supernatant of the alkaline solution was adjusted to 3.5 by using 4M NaOH solution and $H_2O_2$ was injected to make the concentration of $H_2O_2$ in the mixture solution to be 1M.

Step 3: Uranium was removed from a supernatant of the mixture solution with the metals obtained at Step 2 precipitated therein.

To remove a trace of residual metal ions including U from the solution, kelp was first contacted with 0.1M nitric acid, to have its surface modified, and then dried, and pulverized, and then 1 g of the kelp was added to 1 liter of the supernatant of the mixture solution in which metals were precipitated.

Step 4: The solution from which uranium was removed at Step 3 was injected into an electrodialyzer for electrolysis and the acidic solution and the alkaline solution were recovered.

100 ml solution of 0.5M $NaNO_3$ from which uranium was removed was circulated between a cation exchange membrane and anion exchange membrane of the electrodialyzer, and initial 0.1M NaOH solution and 0.1M $HNO_3$ solution were circulated in cathodic chamber and anodic chamber, respectively, while applying a cell voltage of 15 Volt to recover 0.6M NaOH and 0.6M $HNO_3$.

Example 2

Treatment of Spent Uranium Catalyst 2

Spent uranium catalyst was treated in the same manner as Example except for the differences from Step 1 of Example 1 that the 1M $HCO_3$ was changed to 2M $HNO_3$ and the 1M NaOH was changed to 2M NaOH.

Example 3

Treatment of Spent Uranium Catalyst 3

Spent uranium catalyst was treated in the same manner as Example 1, except for the differences from Step 1 of Example 1 that the 1M $HNO_3$ was changed to 4M $HNO_3$ and the 1M NaOH was changed to 4M NaOH.

Example 4

Treatment of Spent Uranium Catalyst 4

Spent uranium catalyst was treated in the same manner as Example 3, except for the differences from Step 2 of Example 3 that the pH of the alkaline solution was adjusted to 2.5 with no addition of $Na_2CO_3$; and $H_2O_2$ and $MgCl_2$.

Comparative Example 1

Spent uranium catalyst was treated is the same manner as Example 3, except for the differences from Step 2 of Example 3 that only the pH was adjusted to 8 without adding $Na_2CO_3$ and $H_2O_2$.

Comparative Example 2

Spent uranium catalyst was treated in the same manner as Example 3, except for the differences from Step 2 of Example 3 that the pH was adjusted to 8 after $Na_2CO_3$ and $H_2O_2$ was not added but $Na_2CO_3$ was added.

Comparative Example 3

Spent uranium catalyst was treated in the same manner as Example 4, except for the differences from Step 2 of Example 4 that the $MgCl_2$ was not added.

Comparative Example 4

Spent uranium catalyst was treated in the same manner as Example 3, except for the differences from Step 2 of Example 3 that the pH of the acidic and alkaline mixture solution was adjusted to 2.3.

Comparative Example 5

Spent uranium catalyst was treated in the same manner as Example 3, except for the differences from Step 2 of Example 3 that the pH of the acidic and alkaline mixture solution was adjusted to 2.7.

Experimental Example

Experimental Example 1

Confirmation of Thermal Treatment Effect on Spent Uranium Catalyst

To check the thermal treatment effect on the spent uranium catalyst, the following experiment was conducted.

Weight changes were measured of the raw sample of the spent uranium catalyst and undissolved spent uranium catalyst after the acid-alkali swing dissolution by thermal treatment.

Figure 14:
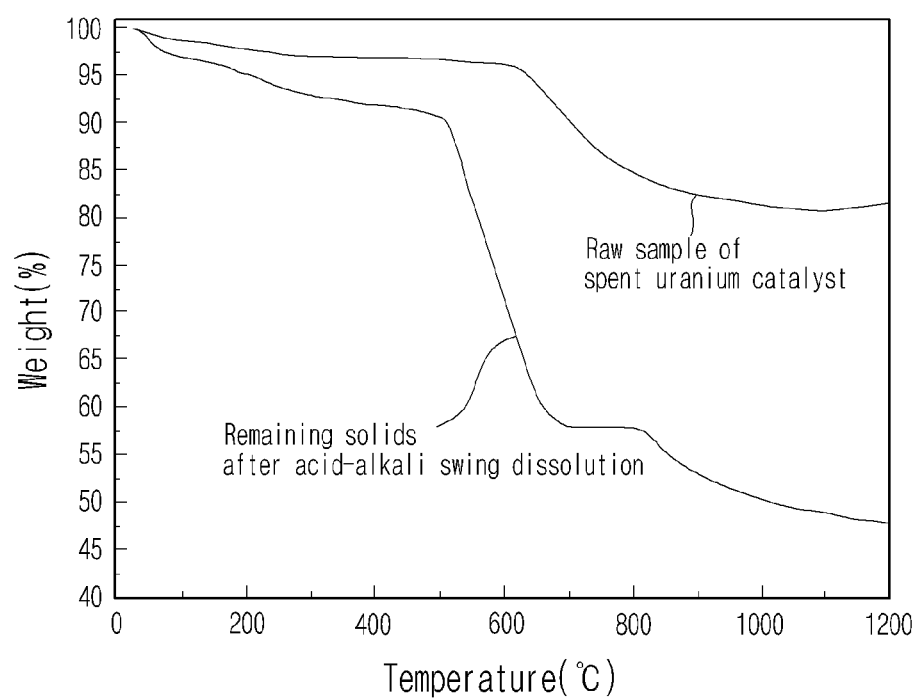
FIG. 14 is a drawing showing changes in weight of a raw sample of spent uranium catalyst and the spent uranium catalyst undissolved in the process of the acid-alkali swing dissolution according to thermal decomposition, according to an embodiment of the present invention.

FIG. 14 is a graph showing the changes in the weights of the raw samples of the spent uranium catalyst and undissolved spent uranium catalyst after the acid-alkali swing dissolution according to the thermal treatment.

Referring to FIG. 14, the weight of the raw sample of the spent uranium catalyst was reduced by approximately 5% until approximately 650° C. and by approximately 15% until 750° C., and the weight was reduced drastically afterwards and was reduced by approximately 20% until 1,000° C.

Compared to this, during the thermal treatment of the undissolved spent uranium catalyst after the acid-alkali swing dissolution, the weight of the sample was reduced by 40% additionally at a temperature of approximately 650~700° C., and by approximately 50% until 1,000° C.

Referring to FIG. 14, it was confirmed that the weight of the spent uranium catalyst can be reduced simply by thermally treating the raw sample of the spent uranium catalyst.

Further, based on the results shown in FIG. 14, the following experiment was conducted in the expectation that a larger amount of weight can be reduced if the thermal treatment is performed on the spent uranium catalyst before the acid-alkali swing dissolution process.

Experimental Example 2

Confirmation of Thermal Treatment Effect on the Dissolution of Spent Uranium Catalyst To check the thermal treatment effect before the acid-alkali swing dissolution process among the spent uranium catalyst treating processes, the following experiment was conducted.

Figure 15:
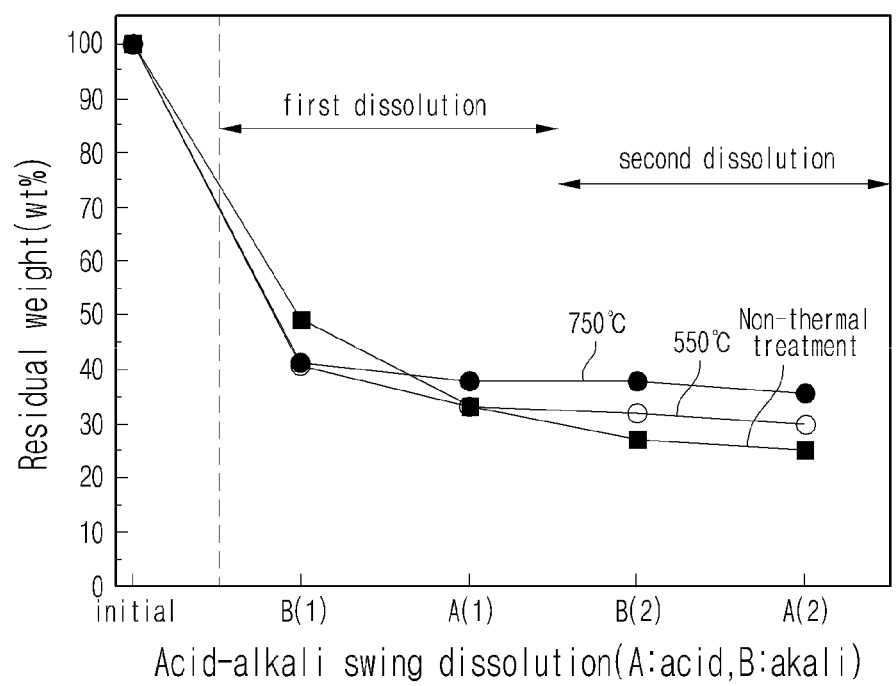
FIG. 15 is a graph showing the changes in weight of the spent uranium catalyst in the process of the acid-alkali swing dissolution after initial thermal treatment or non-thermal treatment of the spent uranium catalyst.

Before the acid-alkali swing dissolution process, the spent uranium catalyst was thermally treated at a temperature of 550° C. and 750° C., and both the thermally-treated spent uranium catalyst and the spent uranium catalyst not treated thermally were dissolved repeatedly through two times of the acid-alkali swing dissolution process for 4 hours each time by using nitric acid and sodium hydroxide as shown in FIG. 15. The weights of the undissolved materials at each dissolution step were then measured.

FIG. 15 is a graph showing the changes in the weight of the spent uranium catalyst during the acid-alkali swing dissolution process after the initial thermal treatment or non-thermal treatment on the spent uranium catalyst.

Referring to FIG. 15, the thermal treatment at a higher temperature can obstruct the acid-alkali swing dissolution more than in the non-thermal treatment.

Based on this, although the thermal treatment on the spent uranium catalyst can reduce the weight due to the organic, carbon, nitrate materials existing in the spent uranium catalyst burn-off, this can also obstruct the dissolution of the spent uranium catalyst because some materials formed during the thermal treatment.

Referring to FIG. 15, the spent uranium catalyst was not desirably dissolved when the thermal treatment was performed before the acid-alkali swing dissolution, but the weight of the spent uranium catalyst could be reduced during the acid-alkali swing dissolution process without the thermal treatment. Based on this, it was confirmed that the acid-alkali swing dissolution process after non-thermal treatment can be more effective in reducing the weight of the spent uranium catalyst.

Therefore, it was considered that the non-thermal treatment before the acid-alkali swing dissolution process can more desirable and thus the present invention employs the treatment method of the spent uranium catalyst without the thermal treatment.

Experimental Example 3

Experiment to Identify Components of Spent Uranium Catalyst

To identify the components of the spent uranium catalyst before performing the swing dissolution, the following experiment was conducted.

The component analysis was conducted by means of wet microwave digestion (CFM corporation, USA, MPRS5) method which uses high temperature (approximately 200° C.), high pressure (approximately 4 atmospheric pressure), and strong acid (hydrochloric acid, nitric acid, hydrofluoric acid) for complete dissolution, and afterwards by means of elementary analysis and dry XRF (Rigaku, Japan, RIX2100) analysis which uses fluorescent X-rays without pretreatment of dry sample. The results are provided in Table 1 below.

TABLE 1

| Element | Content (wt %) |
|---------|----------------|
| Si      | 31.1           |
| Sb      | 15.3           |
| U       | 3.13           |
| Fe      | 6.44           |
| Na      | 2.0            |
| Al      | 0.79           |
| V       | 0.62           |
| S       | 0.43           |
| Mo      | 0.41           |
| Ni      | 0.27           |
| Ca      | 0.17           |
| Mg      | 0.09           |

Referring to Table 1, main components of the spent uranium catalyst were identified as Si, Sb, Fe, and U. Therefore, it was confirmed that the components mainly to be dissolved in the acid-alkali dissolution process include metal components such as Si, Sb, Fe, and U.

Experimental Example 4

Experiment to Identify Components Dissolved in the Acidic and Alkaline Solutions During the Acidic-Alkaline Dissolution Process To identify the components mainly dissolved during the acid-alkali dissolution process (Step 1) in the treatment process of spent uranium catalyst, the following experiment was conducted under the same conditions stated as in Example 3.

For the spent uranium catalyst of 10 g as an initial sample, 100 ml of acidic solution and 100 ml of alkaline solution were used. As the acidic solution and the alkaline solution, 4 M HNO₃ and 4M NaOH were used at 100° C., respectively.

The sample was dissolved in 100° C. 4 M HNO₃ solution at 100° C. again, and the component analysis was conducted on each solution by means of ICP-AES (Inductively Coupled Plasma-Atomic Emission Spectroscopy: PerkinElmer, USA, 5100DV).

Table 2 and Table 3 below show the contents of each dissolved element accumulated in the solution dissolved repeatedly two times for 4 hours each time in the acidic-alkaline solutions.

TABLE 2

2 Times Alkali Dissolved Solution

| element | ppm |
|---|---|
| U | 206 |
| Si | 30895 |
| Fe | 178.61 |
| Mo | 111.8 |
| V | 383.2 |
| Sb | 455.6 |
| Bi | n.d |
| Al | 591.6 |
| Ni | n.d |
| Ca | 5.5 |

TABLE 3

2 Times Acid Dissolved Solution

| element | ppm |
|---|---|
| U | 1965.6 |
| Si | 162.13 |
| Fe | 3090.9 |
| Mo | n.d |
| V | 50.3 |
| Sb | 3.85 |
| Bi | n.d |
| Al | 92.6 |
| Ni | 164.7 |
| Ca | 115.3 |

Based on the results shown in Table 2 and Table 3 above, main soluble components of The spent uranium catalyst were identified: in the alkaline solution, Si was dissolved the most and U, Fe, Sb, Al, and V were dissolved hundreds of ppm for each; and in the acidic solution, U and Fe were mainly dissolved and V and Al were partially dissolved. From this finding above, it was confirmed that the repetitive acid-alkali dissolution can be effective in dissolving the spent uranium catalyst and the amount of Bi dissolved in the spent uranium catalyst was very small.

Experimental Example 5

Experiment to Measure Changes in Weight of Spent Uranium Catalyst according to Acidic and Alkaline Concentrations during the Acid-Alkali Dissolution Process To check the effects of the acidic and alkaline concentration changes during the acid-alkali dissolution process (Step 1) in the spent uranium catalyst treating process, the following experiment was conducted.

The acid-alkali dissolution process was repeatedly conducted under the same conditions as stated in Examples 1 to 3, and the changes in the weight of the spent uranium catalyst were measured at each dissolution process.

Figure 16:
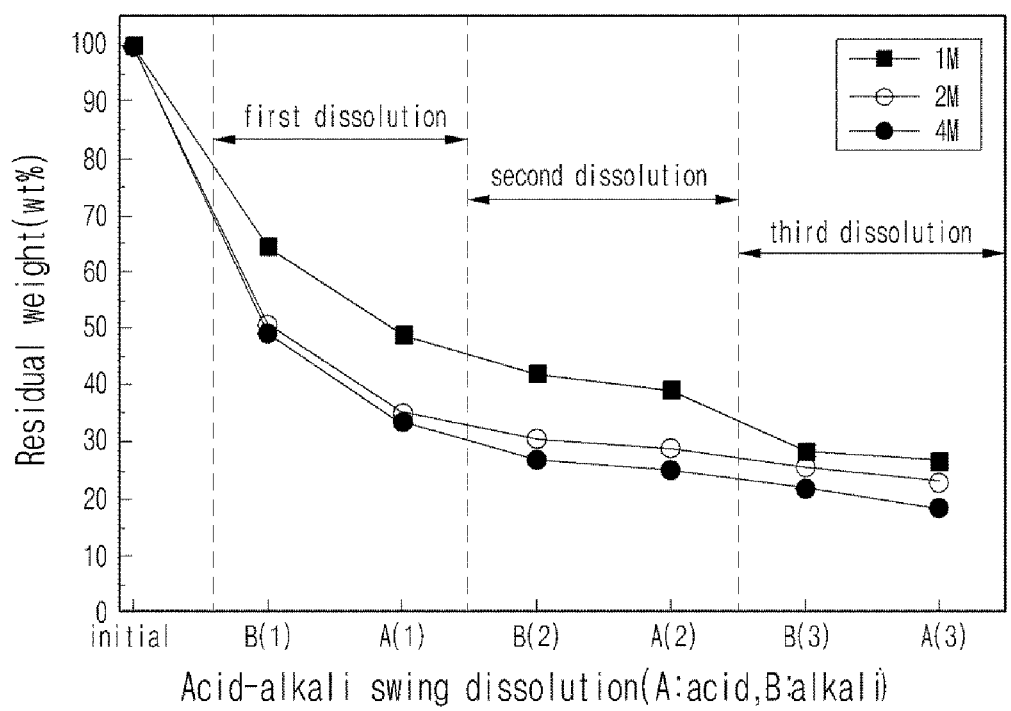
FIG. 16 is a graph showing the changes in weight of the spent uranium catalyst in different concentrations after initial non-thermal treatment of the spent uranium catalyst, according to an embodiment of the present invention.

FIG. 16 is a graph showing the changes in the weight of the spent uranium catalyst according to the changes of acidic and alkaline concentration, which is obtained by performing Step 1 of the spent uranium catalyst treating process under the conditions same as in Examples 1 to 3 according to the present invention.

Referring to FIG. 16, it was confirmed that the weight reduction increased by repeating the sequential acid-alkali dissolution.

Further, the weight reduction increased as the concentrations of the acidic solution and the alkaline solution increased. After 3 times of the acid-alkali dissolution, the weight was reduced by maximum 82% compared to the initial weight.

FIG. 16 shows the weight changes as a result of the Experimental Example which uses the acidic-alkaline solutions of 1M HNO₃ and 1M NaOH, the acidic-alkaline solutions of 2M HNO₃ and 2M NaOH, and the acidic-alkaline solutions of 4M HNO₃ and 4M NaOH and performs the acid-alkali dissolutions 3 times at 100° C. for 4 hours each time.

From the result above, it was confirmed that the repetitive acid-alkali dissolution according to the present invention can be effective in dissolving the spent uranium catalyst.

To check the sequential dissolution mechanisms for each element according to the repetitive acid-alkali dissolution as shown in FIG. 10 and FIG. 11, the spent uranium catalyst was dissolved in 100° C. 4M NaOH for 4 hours, and the undissolved spent uranium catalyst was taken out and dissolved again in 100° C. 4M HNO3, and the remaining solids were dried and then the analysis by means of XRF (X-ray florescence spectrometer: RIX2100, Rigaku, Japan) was performed. The results thereof are provided in FIG. 17.

Figure 17:
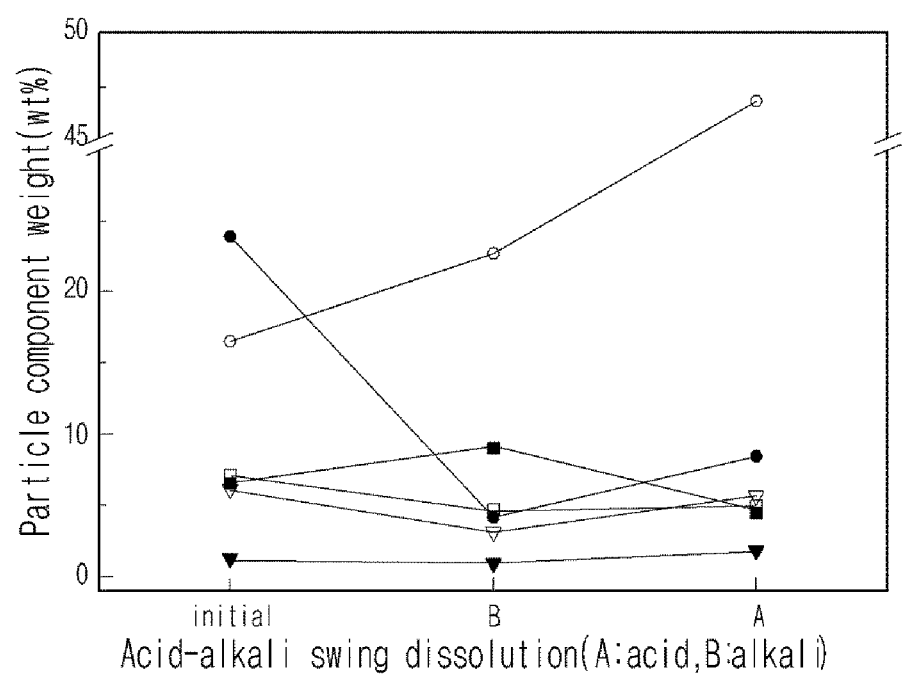
FIG. 17 is a graph showing the changes in weight of metal components and supporter material appearing in the process of the acid-alkali swing dissolution according to an embodiment of the present invention.

Referring to FIG. 17, after the dissolution in the alkaline solution, as Si, a main component of the spent uranium catalyst, decreased, the weight ratios of Sb and Fe increased relatively vastly whereas the weight ratios of U, V, and Mo decreased slightly low. However, as Si was dissolved less in the acidic solution, the weight ratio of Si increased slightly. Based on the fact that the weight ratio of Sb in the alkaline and acidic solutions increased consistently, it was confirmed that the solid remaining at the last after the acid-alkali dissolution was mostly Sb.

From the finding that the weights were reduced vastly as the number of times repeating the sequential dissolution increased, it was confirmed that the increase in the number of times repeating the sequential dissolution in the acidic and alkaline solutions is necessary to obtain the goal of reducing the volume of the spent uranium catalyst.

Further, it was confirmed that the increase in the concentration of the acidic solution and the alkaline solution can be effective in reducing the volume of the spent uranium catalyst.

Experimental Example 6

Experiment to Confirm the Effect of Removing Si from Alkaline Solution according to the Changes of Precipitation Conditions in the Alkaline Solution To check the effects of changing the precipitation conditions in the process (Step 2) of precipitating Si, a supporter material, in the alkaline solution during the spent uranium catalyst treating process, the following experiment was conducted under the same conditions stated as in Example 3 and Comparative Examples 1 and 2.

In Experimental Example 6, the following cases were compared: one was adjusting pH to 8 from pH 14 or above of an initial alkaline solution into which Si was precipitated, i.e. simply adjusting pH to 8 with 4M $HNO_3$ solution solely with no additives; other was adjusting pH to 8 with the addition of $Na_2CO_3$; and another was adjusting pH to 8 with the addition of both $Na_2CO_3$ and $H_2O_2$.

At pH 14 or above, U reacted with $CO_3^{2-}$ and converted easily into a complex form of $UO_2(CO_3)_3^{4-}$ to exist stably. However, since a complex form of $UO_2(O_2)(CO_3)_2^{4-}$ existed stably under a weakly alkaline condition at pH 12 or below, it was important to make $UO_2(O_2)(CO_3)_2^{4-}$ in stable condition by adding $Na_2CO_3$ and $H_2O_2$ after first reducing pH of the solution to approximately 12.

After making $UO_2(O_2)(CO_3)_2^{4-}$ in stable condition, pH was adjusted again to 8, and then Si precipitation and U separation were performed. At the Si refining step, the Si precipitate which was generated from the preceding Si precipitating step was separated exclusively and then re-dissolved in the alkaline solution at pH 14 or above. And the Si was precipitated again in the alkaline solution in which The Si was re-dissolved, while adjusting pH to 8, in the same manner as at the Si precipitating step.

Table 4 below shows the concentrations of U and Si in supernatants obtained at each Si precipitating and refining step (3 times in total).

The fact that U was separated gradual to the supernatants at each stated step suggests very low U content in the final Si precipitate which remains after the effective refinement of the Si precipitate.

In addition, by using MCA (Multi Channel Analyzer; Oxford Instrument Inc. UK), the specific activity of the unrefined Si precipitate in Example 3 experiment was measured at 35.7 Bq/g, which indicates that U was precipitated together with Si as shown in the preceding results of analyzing the concentrations of the supernatants. But, the radioactivity of the final Si precipitate remaining after the refining treatment was very low as much as background so exact measurement could not be obtained. Therefore, U in the solution was analyzed by means of ICP-AES (Inductively Coupled Plasma-Atomic Emission Spectroscopy: PerkinElmer, USA, 5100DA) after the Si precipitate was completely dissolved. And the results were that the U in the finally refined solid Si precipitate was less than approximately 30 ppm, which is equivalent to less than 1 Bq/g as converted into radioactivity. (For reference, a solid with de depleted uranium (U-234; 0.001%, U-235; 0.194%, U-238; 99.805%) of 67 ppm has a radioactivity of 1 Bq/g). Based on this analysis, it was confirmed that $SiO_2$, which takes up approximately 60% of the spent uranium catalyst, can be refined to a level of exempt waste for clearance through the selective Si precipitation—Si refining processes after the repetitive acid-alkali dissolution.

TABLE 4

| Experimental Condition | Si Precipitation (ppm) | | 1st Si Refining Step (ppm) | | 2nd Si Refining Step (ppm) | | 3rd Si Refining Step (ppm) | |
|---|---|---|---|---|---|---|---|---|
|  | C of U | C of Si | C of U | C of Si | C of U | C of Si | C of U | C of Si |
| Comp. Example 1 (simply adjust pH) | 1.5 | 47.5 | | | | | | |
| Comp. Example 2 ($Na_2CO_3$ added) | 5.3 | 53.9 | 0.87 | 57.7 | 0.79 | 58.5 | 0.65 | 57.9 |
| Example 3 ($Na_2CO_3$ + $H_2O_2$ added) | 78.2 | 53.5 | 21.2 | 62.2 | 9.2 | 45.9 | 2.6 | 53.0 |

C = concentration

Based on Table 4 above, the concentrations of U and Si in the supernatant of the alkaline solution may be 106.6 ppm and 15,980 ppm, respectively, on the assumption that there is no precipitation of U and Si after the pH adjustment.

Therefore, when U and Si are precipitated together, the U separating effect cannot be significant even if the Si refining steps are performed.

In Comparative Example 2, compared to Comparative Example 1, the concentrations of U in the supernatants of the alkaline solution and the acidic solution were measured relatively high, but the most of U and Si were co-precipitated together.

Based on the results that the concentrations of U in the supernatants were very low, i.e. less than 1 ppm, at 3 times of the Si refining step, Si was not effectively refined and U was not effectively separated.

Contrary to this, in the case where $Na_2CO_3$ and $H_2O_2$ were added to form a complex of $UO_2(O_2)(CO_3)_2^{4-}$ and pH was adjusted to 8, the concentration of U in the supernatants at the Si precipitation step was 78.2 ppm, which means approximately 70% of U, compared to the initial value, exists in the supernatants and the remaining 30% only of U was precipitated to ether with Si.

As shown in Table 4, the Si precipitation and refining technology suggested in this present invention can be highly effective in leaving U in the solution and forming a high-purity Si precipitate which may be released into environment.

Experimental Example 7

Experiment to Confirm the Effect of Removing Si from Alkaline Solution According to the Changes of Precipitation Conditions in the Alkaline Solution To check the effects of changing the precipitation conditions in the process (Step 2) of precipitating Si, a supporter material, in the alkaline solution during the spent uranium catalyst treating process, the following experiment was conducted under the same conditions stated as in Example 4 and Comparative Example 3.

In Experimental Example 7, the following cases were compared: the Si precipitation yield when 4M $HNO_2$ was used in alkaline solution for simply adjusting pH to 2.5; and the Si precipitation yield when 0.1M $MgCl_2$ was added after pH was adjusted to 2.5 and was stirred at 60° C. for 18 hours.

In addition, the refining process in which Si precipitate was dissolved again in 4M. NaOH while pH was adjusted again to 2.5 and $MgCl_2$ was added was repeated.

Table 5 below shows the concentrations of U and Si in the supernatants of the alkaline solution at each step of Si precipitation and refinement.

TABLE 5

| Experimental Condition | Si Precipitation (unit: ppm) | | 1st Si Refinement Step (unit: ppm) | |
|---|---|---|---|---|
| | Concentration of U | Concentration of Si | Concentration of U | Concentration of Si |
| Comparative Example 3 (simply adjusting pH) | 81.8 | 6744.9 | | |
| Example 4 (adjusting pH, $MgCl_2$ added, stirring at 60° C. for 18 hrs.) | 81.3 | 579.8 | 19.8 | 171.3 |

From Table 5, on the assumption that there is no precipitation after the adjustment of PH, the concentrations of U and Si in the supernatants were 98 ppm and 14,711.9 ppm, respectively.

Referring to Table 5, the concentrations of U and Si in the supernatants of the alkaline solution at the Si precipitation and refinement steps were shown. The Si precipitation yield was no more than 54.2% in the case of Comparative Example 3 and thus a high-purity Si could not be separated effectively from the solution generated after the alkaline dissolution because U was partially precipitated together in the precipitate.

However, as shown in Table 5, U existed in the supernatant at the same concentration and the Si precipitation yield increased to 96%, when pH was adjusted to less than 3 during the Si precipitation. When the Si precipitation began $Cl^-$ ion was added and stirred at an increased temperature of 60° C. for 18 hours to prevent Si from gelation and to precipitate as a particulate $SiO_2$. From this experiment, it was confirmed that the above-mentioned condition can satisfy a Si precipitation of 96%, which was preferable for the U adsorption in following Step 4, because little amount of Si ion remain in the supernatant after Si precipitation.

However, because U was partially co-precipitated in the Si precipitate generated even under this condition, the Si precipitate was re-dissolved in the alkaline solution with pH 14 or above and Si was precipitated repeatedly to be refined as a Si precipitate which can be released into environment.

As shown in Table 5, it was confirmed that the concentrations of U and Si in the supernatants of the alkaline solution decreased drastically to 19.8 ppm and 171.3 ppm, respectively, after the first refinement.

Based on Experimental Example 7, it was confirmed that U can be sufficiently removed from the Si precipitate through the repetitive re-dissolution and re-precipitation in the alkaline solution.

Experimental Example 8

Experiment to Confirm the Effect of Removing U from Solution according to the Changes of Precipitation Condition in a Mixture solution of Acidic Solution and Alkaline Solution To check the effects of changing the precipitation conditions in the process (Step 2) of precipitating metal materials in a mixture solution of the acidic solution and the supernatant of the alkaline solution, the following experiment was conducted according to Example 4 and Comparative Examples 4 and 5.

4M NaOH was added to a mixture solution of the acidic solution at Step 1 and the supernatant of the alkaline solution after Si precipitation at Step 2 to adjust pH to 2.3, 2.7, and 3.5, respectively. And then $H_2O_2$ was injected to make the concentration of $H_2O_2$ in the solution to approximately 1M, and 1 day of precipitation time was given so that the precipitation reaction fully occurs. The results thereof are provided in Table 6.

Referring to Table 6, which shows the concentrations of U and Fe in the solution according to pH, the concentrations of U were 264.1 ppm and 150.9 ppm, respectively, at pH 2.3 and pH 2.7 of the mixture solution, which correspond to U precipitation yields of 79.7% and 88.4%, respectively. But, these yields did not meet the goal level, and the reason of which was considered that $UO_4$ precipitation yield decreases in a strong acidic condition. In this case, the color of the solution was dark red, which implies an occurrence of slight Fe precipitation, but given the fact that the concentration of Fe in the solution was not significantly different from the initial concentration, the result means that Fe was not sufficiently precipitated yet. On the other hand, when pH was increased up to 3.5, a large amount of Fe precipitate was measured and the concentration of Fe in the supernatant was not detected. And, the concentration of U in the supernatant was measured at 2.2 ppm, which corresponds to the U precipitation yield of approximately 99.8% as $UO_4$ at pH 3.5.

TABLE 6

| | Fe—U Precipitation (unit: ppm) | | |
|---|---|---|---|
| Experimental Condition | Concentration of U | Concentration of Fe | Remark (unit: ppm) |
| Comparative Example 4 (adjusting pH to 2.3) | 264.1 | 2015.8 | Fe Not Precipitated |
| Comparative Example 5 (adjusting pH to 2.7) | 150.9 | 2033.5 | Fe Not Precipitated |
| Comparative Example 6 (adjusting pH to 3.5) | 2.2 | n.d | Fe Precipitated |

From Table 6, on the assumption that there was no precipitation after the adjustment of pH, the concentrations of U and Fe would be 1,300.8 ppm and 2,045.4 ppm, respectively, in the mixture solution of the acidic solution and the supernatant of the alkaline solution after the precipitation of Si.

As stated above, since an amount of Fe—U precipitate obtained from the mixture solution was relatively small compared to that of Si precipitate obtained from the alkaline solution generated in the process of dissolving spent uranium catalyst, precipitating $Fe(OH)_3$ and $UO_4$ simultaneously, not selectively and separately, to dispose of them as a radioactive waste can be effective in terms of operating convenience in the process of treatment of spent uranium catalyst.

In theory, adjusting pH of the solution in which U and Fe co-exist to 3.5 with $H_2O_2$ not used therein enables the mutual separation of Fe and U as Fe is exclusively precipitated. But, in actuality, an excessive amount of Fe was precipitated and a small amount of U was co-precipitated along with Fe. Radioactivity of the Fe—U precipitate obtained from Example 1 in which pH was adjusted to 3.5 with no usage of $H_2O_2$ was measured at 4394.3 Bq/g. In this case, in order to check whether the Fe precipitate was separable from U co-precipitated during the refinement process, the Fe—U precipitate was separated and re-dissolved in the mixture solution of the acidic solution and the supernatant of the alkaline solution after the Si was precipitated, and then pH was adjusted to 3.5. Radioactivity of the Fe precipitate generated from the case above was measured at 1559.6 Bq/g. Therefore, it was confirmed that that U can be gradually separated from the U-bearing Fe precipitate by repeating the refinement process. However, unlike the preceding refinement process for the Si precipitate, a greater times of the refinement process need to be performed to treat the Fe precipitate to the level that can be discharged to the environment because the mixture solution of the acidic solution and the supernatant of the alkaline solution after the Si precipitation is precipitated has a higher content of U and thus a larger amount of U is co-precipitated in the Fe precipitate.

As stated above, since an amount of Fe—U precipitate obtained from the mixture solution was relatively much small compared to the Si precipitate obtained from the alkaline solution generated in the process of dissolving spent uranium catalyst, precipitating Fe and U simultaneously, not selectively and separately, to dispose of them as a radioactive waste can be effective in terms of operating convenience. Further, compared to precipitating U exclusively to $UO_4$, precipitating U together with $Fe(OH)_3$ to $UO_4$ can reduce the operating hours as U ion is coagulated-precipitated together with $Fe(OH)_3$ to accelerate the precipitation speed of U.

Experimental Example 9

Experiment to Confirm Uranium Elimination from Supernatant after U—Fe Precipitation by Using an Absorbent To check the uranium removal from the supernatant obtained after U—Fe precipitation at Step 3 by using an adsorbent, the following experiment was conducted.

According to the present invention, kelp was contacted with 0.1M nitric acid for surface modification and then dried and pulverized to eliminate metal ions including a small amount of U remained in the solution. And 1 g of kelp was added per 1 liter of the supernatant and the changes in the concentration of U in the supernatant approximately at pH 3 were measured. The results of Experimental Example 9 were provided in Table 7 below.

Metal ions-loaded adsorbent was ignited at atmosphere and the weight reduction according to the ignition treatment was measured.

Figure 18:
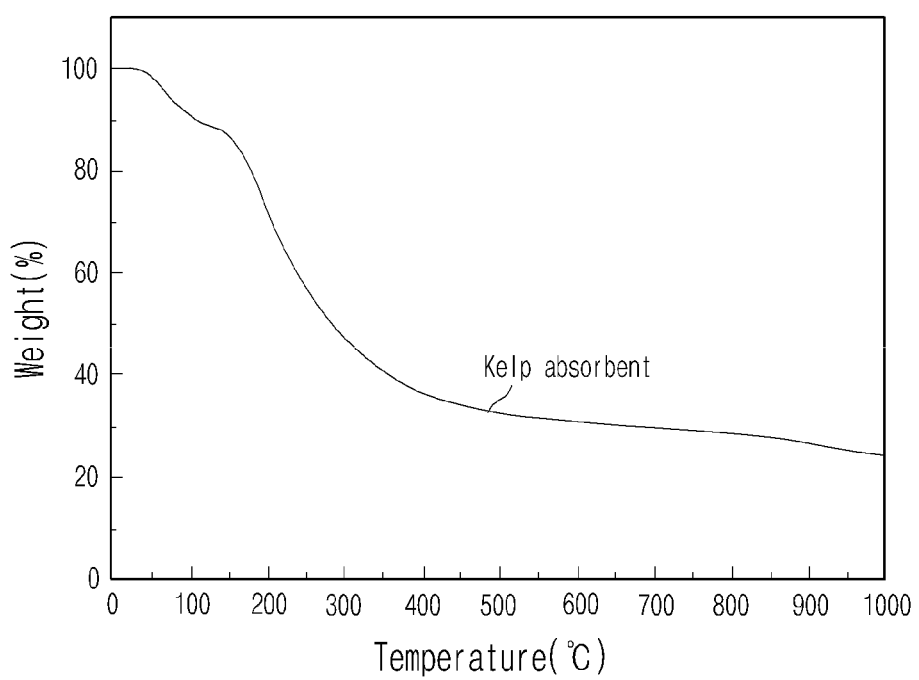
FIG. 18 is a graph showing the changes in weight of an adsorbent of kelp as a type of biosorbent to adsorb U by ignition, according to an embodiment of the present invention.

FIG. 18 shows the result of Experimental Example 10 in which a thermal decomposition characteristic analysis of the adsorbent used in above experimental example 9.

Referring to FIG. 18, the weight was reduced by approximately 75% at 500° C.

Referring to FIG. 18, it was confirmed that the process of igniting the absorbent with the metal ions for reducing the volume of the used U and other metals and stabilizing the adsorbed metal materials can be effective.

Experimental Example 11

Experiment to Confirm the Recovery of Acidic and Alkaline Solutions through Electrolysis To check the possibility of recovering the acidic solution and the alkaline solution at Step 4, the following experiment was conducted.

100 ml of the 0.5 M $NaNO_3$ solution was recycled in between a cation exchange membrane and an anion exchange membrane of an electrodialysis cell, and the initial 0.1M NaOH solution and the 0.1M $HNO_3$ solution were recycled in cathodic chamber and in anodic chamber, respectively. A cell voltage of 15 Volt was applied between anode and cathode to recover 0.5M NaOH and 0.5M $HNO_3$.

Figure 19:
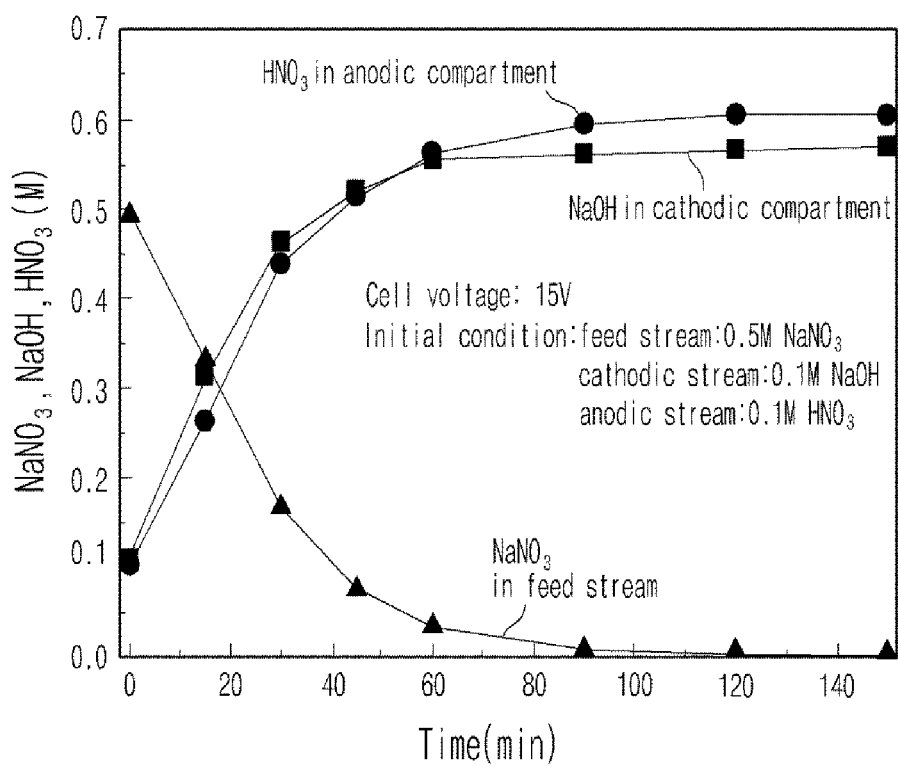
FIG. 19 is a graph showing the changes in concentration of recovered acidic and alkaline solutions and in feed solution without uranium during the electrodialysis, according to an embodiment of the present invention.

FIG. 19 shows the results of the changes in the concentration of $HNO_3$, NaOH, and $NaNO_3$ measured in the anodic, cathodic, and feed chambers.

Referring to FIG. 19, $Na^+$ and $NO_3^-$ ions which were fed between the two ion exchange membranes were migrated to cathode and anode sides through the cation exchange mem-

TABLE 7

| | | U (ppm) | Si (ppm) | Sb (ppm) | Ca (ppm) | Fe (ppm) | Mo (ppm) | Ni (ppm) | V (ppm) | Al (ppm) |
|---|---|---|---|---|---|---|---|---|---|---|
| Supernatant of Alkaline Solution | initial | 2.1 | 46.2 | 24.7 | 2.4 | n.d | 48.1 | n.d | 169.4 | 0.9 |
| | after treatment | n.d | 41.9 | 21.4 | 31.9 | n.d | 44.7 | n.d | 162.6 | 0.8 |
| Supernatant of Acidic Solution | initial | 2.2 | 0.3 | n.d | 83.8 | 2.1 | n.d | 88.4 | n.d | 39.2 |
| | after treatment | n.d | 0.3 | n.d | 90.5 | n.d | n.d | 90.4 | 0.1 | 36.6 |

Referring to Table 7, U existing in the mixture solution of the alkaline solution and the supernatant of the acidic solution was completely removed from the solutions and thus the solutions generated during the spent uranium catalyst treating process shown in FIG. 9 can have the radioactivity level that can be discharged into the environment.

Referring to Table 7, it was confirmed that the treatment using the adsorbent in the supernatant of the alkaline solution and the supernatant of the acidic solution can be effective in removing uranium from the spent uranium catalyst.

Experimental Example 10

Experiment to Check whether Absorbent Ignition is an Effective Way to Reduce the Weight To check the effect of ignition of used absorbent on reduction of its volume, the following experiment was conducted.

brane and the anion exchange membrane, respectively. While the electrolysis was generated by applying voltage between the anode and the cathode, water split reactions occurred to produce OH— at cathode and H+ at anode, which produced NaOH and $HNO_3$ in the cathodic and anodic chambers, respectively. The recovered concentration of acid and alkali were 0.5M, respectively.

Due to the characteristics of the ion exchange membranes arranged along the path through which the uranium-eliminated solution passes, the liquid solution was smoothly pass through and thus the secondary wastes can be minimally generated. Through the process as stated above, 0.5M NaOH and 0.5M $HNO_3$ were obtained and can be reused for the spent uranium catalyst treating process.

Referring to FIG. 19, it was confirmed that the electrodialysis process can be effective in recovering the acidic solution and the alkaline solution for minimization of secondary liquid waste generated in the process of treatment of spent uranium catalyst devised in present invention.

Experimental Example 12

Experiment to Evaluate Volume and Weight Reduction of Waste Generated at Respective Steps of Spent Uranium Catalyst Treatment Process The following experiment was conducted to investigate volume and weight reduction effects at respective steps (Steps 1 to 1) of the spent uranium catalyst treatment process.

The weight of the undissolved solids was measured at Step 1, and the weight: of the precipitate in the alkaline solution and acidic solution was measured at Step 2. The weight of U adsorption waste was then measured at Step 3.

Table 8 lists volume and weight reduction rates of the wastes which are generated at respective steps of the treatment of spent uranium catalyst (1000 g), according to an embodiment of the present invention.

TABLE 8

|  | Undissolved Solution | U—Fe Precipitate after Acidic Dissolution | U-absorbed Waste | Final Reduction Rate |
|---|---|---|---|---|
| Weight (g) generated at each step | 107 | 119.4 | 6.8 | 76.7% |
| Volume (ml) generated at each step | 57.34 | 74.63 | 3.78 | 89.4% |
| Tap density (g/ml) | 1.866 | 1.60 | 1.8 | — |

Referring to Table 8, the volume reduction yield was evaluated based on tap density measurement of the wastes from the respective steps.

According to the result of Table 8, U—Fe precipitate after acidic dissolution is the waste that most affects the final weight and volume reduction yields.

In one embodiment of the present invention, the final weight and volume reduction rates of Fe content (6.4%) of the spent uranium catalyst were 76.7% and 89.5%, respectively.

Referring to Table 8, it is considered that U—Fe precipitate after Step 3 is the radioactive waste that most affects the final weight and volume reduction yields, according to an embodiment of the present invention.

Since the average content of Fe in the spent uranium catalyst is generally 3%, weight reduction yield of about 81.8%, and volume reduction yield of about 92.3% are expected, when the spent uranium catalyst with average 3% Fe content is used.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A treatment method of a spent uranium catalyst, comprising steps of:
   Step 1: dissolving the spent uranium catalyst in an alkaline solution, taking at least a part of undissolved uranium catalyst out from the alkaline solution and dissolving the at least a part of undissolved spent uranium catalyst further in an acidic solution;
   Step 2: precipitating Si by either (a) adding carbonate and hydrogen peroxide into the alkaline solution in which the spent uranium catalyst is dissolved at Step 1 and adjusting pH to 6~10 or (b) by adding one selected from the group consisting of $MgCl_2$, $CaCl_2$, KCl, and NaCl while lowering pH of the alkaline solution in which the spent uranium catalyst is dissolved at Step 1 to pH 4 or below to generate a supernatant of the alkaline solution, and precipitating metal materials of the spent uranium catalyst by adding hydrogen peroxide into a mixture solution of the acidic solution in which at least a part of the undissolved spent uranium catalyst is dissolved at Step 1 and the supernatant of the alkaline solution in which the Si is precipitated while adjusting pH to generate a supernatant of the mixture solution; and
   Step 3: removing uranium from the supernatant of the mixture solution after the metal materials are precipitated.

2. The treatment method of the spent uranium catalyst as set forth in claim 1, wherein the spent uranium catalyst is in a form in which a Si supports $U_wSb_xM_yO_z$, wherein M=one or more selected from among Fe, Al, Mo, V, and Bi, and w, x, y, and z represent a molar ratio to construct oxide.

3. The treatment method of the spent uranium catalyst as set forth in claim 1, comprising repeating a process of precipitating the Si by adding carbonate and hydrogen peroxide into the alkaline solution in which the spent uranium catalyst is dissolved at Step 1 and adjusting the pH of the alkaline solution to pH 6~10.

4. The treatment method of the spent uranium catalyst as set forth in claim 1, wherein the pH of the mixture solution of the acidic solution in which the undissolved spent uranium catalyst dissolved at Step 1 and the supernatant of the alkaline solution in which the Si is precipitated, is adjusted up to pH 3~4.

5. The treatment method of the spent uranium catalyst as set forth in claim 1, wherein the acidic solution is one or more selected from the group consisting of nitric acid, sulfuric acid, hydrochloric acid, hydrofluoric acid, and phosphoric acid.

6. The treatment method of the spent uranium catalyst as set forth in claim 1, wherein the alkaline solution is one or more selected from the group consisting of sodium hydroxide, potassium hydroxide, lithium hydroxide, and ammonium hydroxide.

7. The treatment method of the spent uranium catalyst as set forth in claim 1, wherein the Step 1 is performed repeatedly.

8. The treatment method of the spent uranium catalyst as set forth in claim 1, after the Step 1, further comprising a step of thermally treating a remaining part of the spent uranium catalyst remaining undissolved.

9. The treatment method of the spent uranium catalyst as set forth in claim 8, wherein the thermally treating is performed at a temperature of 500~800° C.

10. The treatment method of the spent uranium catalyst as set forth in claim 1, wherein the carbonate at the Step 2 is sodium carbonate ($Na_2CO_3$).

11. The treatment method of the spent uranium catalyst as set forth in claim 1, wherein the metal material precipitated at the Step 2 is Fe or U.

12. The treatment method of the spent uranium catalyst as set forth in claim 1, after the Step 2, further comprising a process of thermally treating wastes as obtained.

13. The treatment method of the spent uranium catalyst as set forth in claim 12, wherein the thermally treating is performed at a temperature of 500~800° C.

14. The treatment method of the spent uranium catalyst as set forth in claim 1, wherein the removing of the uranium at the Step 3 is performed by using an adsorbent.

15. The treatment method of the spent uranium catalyst as set forth in claim 14, wherein the adsorbent used is activated carbon or biosorbent.

16. The treatment method of the spent uranium catalyst as set forth in claim 15, wherein the biosorbent is one selected from the group consisting of sea mustard, kelp, and gulfweed.

17. The treatment method of the spent uranium catalyst as set forth in claim 14, further comprising a step of igniting the adsorbent used at a temperature of 500~800° C.

18. The treatment method of the spent uranium catalyst as set forth in claim 1, further comprising Step 4: injecting a solution from which the uranium is removed at the Step 3 into an electrodialyzer for recovering the acidic solution and the alkaline solution.

19. The treatment method of the spent uranium catalyst as set forth in claim 18, further comprising a step of recycling the acidic solution and the alkaline solution recovered from the Step 4 to the Step 1.

20. The treatment method of the spent uranium catalyst as set forth in claim 18, wherein the solution that is injected is one or more selected from the group consisting of sodium hydroxide, lithium hydroxide, potassium hydroxide, and ammonium hydroxide, and the solution is injected in between a cathode and a cation exchange membrane of the electrodialyzer which is equipped with the cation exchange membrane and an anion exchange membrane; and Step 4 comprises:
    injecting the solution from which the uranium is removed in between the anion exchange membrane and cation exchange membrane;
    injecting one or more selected from the group consisting of nitric acid, sulfuric acid, hydrochloric acid, hydrofluoric acid and phosphoric acid in between the anion exchange membrane and an anode;
    and electrolyzing water by applying a voltage of 5-30V to recover the acidic solution and the alkaline solution.

* * * * *